US012197859B1

(12) United States Patent
Malviya et al.

(10) Patent No.: US 12,197,859 B1
(45) Date of Patent: Jan. 14, 2025

(54) IDENTIFYING AND ANALYZING ACTIONS FROM VECTOR REPRESENTATIONS OF ALPHANUMERIC CHARACTERS USING A LARGE LANGUAGE MODEL

(71) Applicant: Citibank, N.A., New York, NY (US)

(72) Inventors: Shardul Malviya, London (GB); Wayne Liao, London (GB); Deepak Jain, London (GB); Samantha Cory, London (GB); Mariusz Saternus, Cracow (PL); Daniel Lewandowski, Cracow (PL); Biraj Krushna Rath, London (GB); Stuart Murray, London (GB); Philip Davies, London (GB); Payal Jain, London (GB); Tariq Husayn Maonah, London (GB)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/782,019

(22) Filed: Jul. 23, 2024

Related U.S. Application Data

(63) Continuation-in-part of application No. 18/771,876, filed on Jul. 12, 2024, which is a continuation-in-part
(Continued)

(51) Int. Cl.
*G06F 40/216* (2020.01)
(52) U.S. Cl.
CPC ................... *G06F 40/216* (2020.01)
(58) Field of Classification Search
CPC .................................... G06F 40/216
See application file for complete search history.

(56) References Cited

U.S. PATENT DOCUMENTS 9,842,045 B2   12/2017   Heorhiadi et al.
11,573,848 B2   2/2023   Linck et al.
(Continued)

FOREIGN PATENT DOCUMENTS

WO   WO-2022125803 A1 *   6/2022   .......... G06F 16/906
WO   2024020416 A1   1/2024

OTHER PUBLICATIONS

Generative machine learning models; IPCCOM000272835D, Aug. 17, 2023. (Year: 2023).
(Continued)

*Primary Examiner* — Yonas A Bayou
(74) *Attorney, Agent, or Firm* — Perkins Coie LLP

(57) ABSTRACT

The systems and methods disclosed herein receive an output generation request from that includes input for generating an output using a language model. The input includes a set of alphanumeric characters associated with operative standards for a first set of actions. The system divides the set of alphanumeric characters into text subsets. For each text subset, a vector representation is determined. Prompts are created for each vector representation including the set of alphanumeric characters, query contexts, keywords, and/or the text subset. Each vector representation's prompt is input into the language model, which generates a second set of actions of related actions, where subsequently generated actions are based on prior generated actions. The system aggregates the second set of actions into a third set of actions and displays a graphical layout. The graphical layout displays a representation of the set of alphanumeric characters and the corresponding actions.

20 Claims, 19 Drawing Sheets

Related U.S. Application Data of application No. 18/661,532, filed on May 10, 2024, now Pat. No. 12,111,747, which is a continuation-in-part of application No. 18/661,519, filed on May 10, 2024, now Pat. No. 12,106,205, which is a continuation-in-part of application No. 18/633,293, filed on Apr. 11, 2024.

(56) References Cited

U.S. PATENT DOCUMENTS

| | | | |
|---|---|---|---|
| 11,656,852 | B2 | 5/2023 | Mazurskiy |
| 11,750,717 | B2 | 9/2023 | Walsh et al. |
| 11,875,123 | B1 | 1/2024 | Ben David et al. |
| 11,875,130 | B1 | 1/2024 | Bosnjakovic et al. |
| 11,924,027 | B1 | 3/2024 | Mysore et al. |
| 11,947,435 | B2 | 4/2024 | Boulineau et al. |
| 11,960,515 | B1 | 4/2024 | Pallakonda et al. |
| 11,983,806 | B1 | 5/2024 | Ramesh et al. |
| 11,990,139 | B1 | 5/2024 | Sandrew |
| 11,995,412 | B1 | 5/2024 | Mishra |
| 12,001,463 | B1 | 6/2024 | Pallakonda et al. |
| 12,026,599 | B1 | 7/2024 | Lewis et al. |
| 2017/0262164 | A1* | 9/2017 | Jain .................. G06F 3/04847 |
| 2022/0179906 | A1* | 6/2022 | Desai .................. G06F 16/906 |
| 2022/0311681 | A1* | 9/2022 | Palladino ............ H04L 41/0661 |
| 2022/0318654 | A1 | 10/2022 | Lin et al. |
| 2022/0366140 | A1* | 11/2022 | Saito .................. G06F 40/56 |
| 2023/0269272 | A1 | 8/2023 | Dambrot et al. |
| 2024/0020538 | A1* | 1/2024 | Socher ............ G06F 16/90332 |
| 2024/0095077 | A1* | 3/2024 | Singh .................. G06F 9/5027 |
| 2024/0129345 | A1 | 4/2024 | Kassam et al. |
| 2024/0202442 | A1* | 6/2024 | Saito .................. G06F 16/34 |

OTHER PUBLICATIONS

Peers, M., "What California AI Bill Could Mean," The Briefing, published and retrieved Aug. 30, 2024, 8 pages, https://www.theinformation.com/articles/what-california-ai-bill-could-mean.

Empower Your Team with a Compliance Co-Pilot, Sedric, retrieved on Sep. 25, 2024. https://www.sedric.ai/.

Cranium, Adopt & Accelerate AI Safely, retrieved on Nov. 7, 2024, from https://cranium.ai/.

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Hu, Q., J., et al., "Routerbench: A Benchmark for Multi-LLM Routing System," arXiv:2403.12031v2 [cs.LG] Mar. 28, 2024, 16 pages.

Mathews, A. W., "What AI Can Do in Healthcare-and What It Should Never Do," The Wall Street Journal, published on Aug. 21, 2024, retrieved on Sep. 5, 2024, https://www.wsj.com.

* cited by examiner

| Performance Metric 802 | Usage Value 804 | Maximum Value 806 | Threshold Metric Value 808 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

*FIG. 8*

| Hardware Configuration 1110 | | Software Configuration 1130 | | Communication Configuration 1150 | |
|---|---|---|---|---|---|
| CPU Arch. | x86 | Operating System | OpSys A | Wireless Network Interface | 802.11 b 2.4GHz |
| GPU Arch. | SIMD | OS Version | 2.4.5 | Wireless Network Type | WPA2 |
| Storage Type | SSD | Home Path | '/home' | Wireless Network Encryption | AES |
| Storage Space | 1 TB | Display Identifier | '/disp' | Wireless Network Ports | 80 and 443 |
| Memory Space | 16 GB | Language | 'en_GB.UTF-8' | Ethernet Input | IEEE 802.3 |
| | | | | Ethernet Cable | IEEE 802.3 |
| | | | | Ethernet Connector | RJ45 |
| | | | | Ethernet Ports | 80 and 443 |

*FIG. 11*

IDENTIFYING AND ANALYZING ACTIONS FROM VECTOR REPRESENTATIONS OF ALPHANUMERIC CHARACTERS USING A LARGE LANGUAGE MODEL

CROSS-REFERENCE TO RELATED APPLICATION(S)

This application is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE E LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. The content of the foregoing applications is incorporated herein by reference in their entirety.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. A large language model (LLM) is a language model notable for its ability to achieve general-purpose language generation and other natural language processing tasks such as classification. LLMs can be used for text generation, a form of generative AI (e.g., GenAI, GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

Generally, organizations are required to adhere to compliance requirements that are set by the government and various regulatory bodies. Different forms of organizations are subject to compliance with a variety of forms of regulation from an assortment of regulatory bodies. However, increasing compliance requirements for an organization is leading to a more challenging operating environment for organizations. Regulators are taking stronger actions against non-compliance by imposing large penalties and causing potential loss of reputation for non-compliant parties. There is a lack of a practical manner to generate actionable items from the regulations and guidelines, where the actionable items are actions that the organization can implement to adhere to the regulations or guidelines.

BRIEF DESCRIPTION OF THE DRAWINGS

FIG. 8 shows a schematic of a data structure illustrating a system state and associated threshold metric values, in accordance with some implementations of the present technology.

FIG. 11 shows a data structure depicting a virtual machine configuration, in accordance with some implementations of the present technology.

Figure 1:
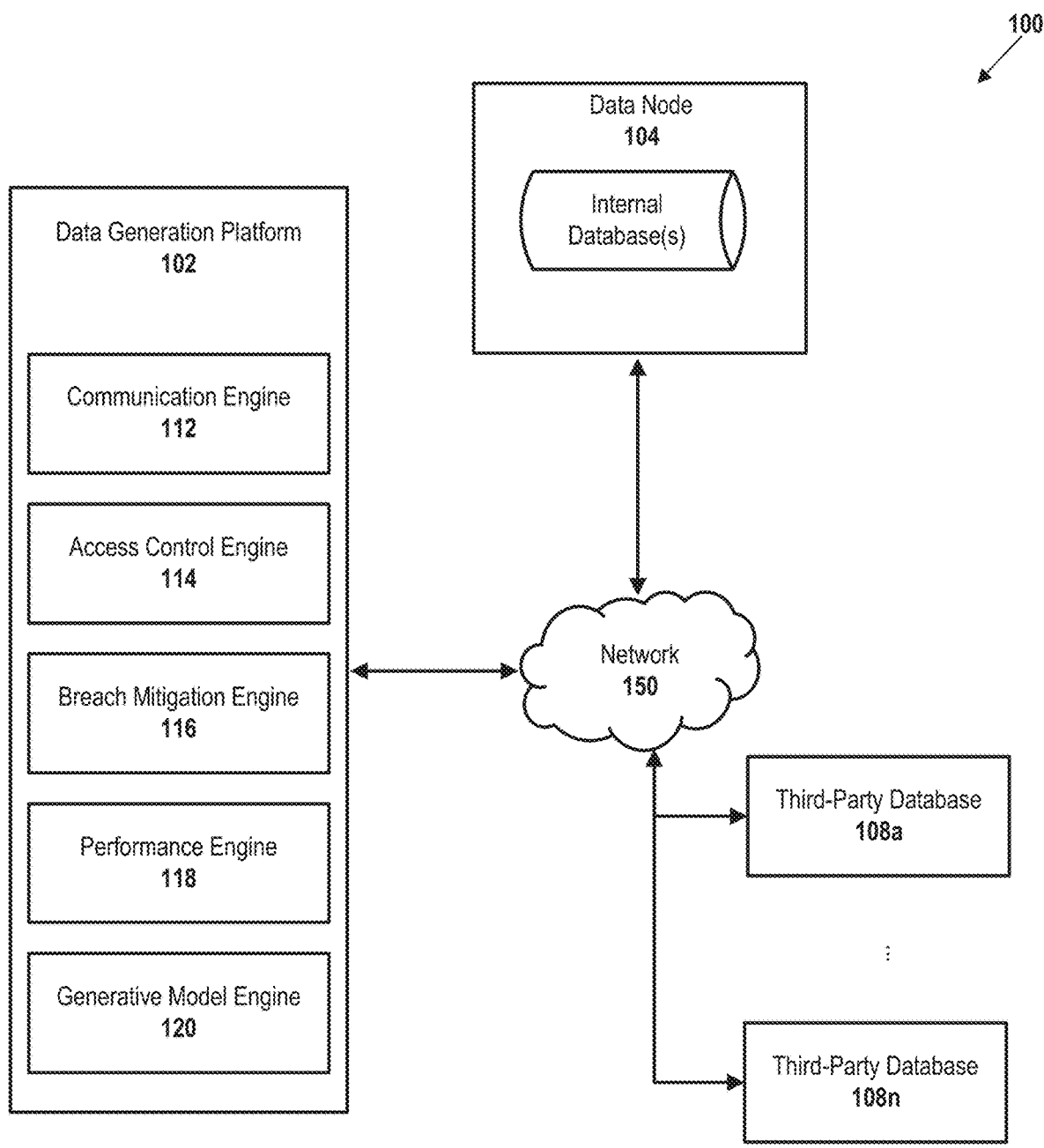
FIG. 1 shows an illustrative environment for evaluating language model prompts and outputs for model selection and validation, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Pre-existing LLMs and other generative machine learning models are promising for a variety of natural language processing and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As such, pre-existing systems risk selection of sub-optimal (e.g., relatively inefficient and/or insecure) generative machine learning models. Furthermore, pre-existing software development systems do not control access to various system resources or models. Moreover, pre-existing development pipelines do not validate outputs of the LLMs for security breaches in a context-dependent, and flexible manner. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, pre-existing software development pipelines can require manual application of rules or policies for output validation depending on the precise nature of generated output, thereby leading to inefficiencies in data processing and application development.

The data generation platform disclosed herein enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model. Based on the results of the prompt validation model, the data generation platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The inventors have also developed a system for dynamically selecting models for processing user prompts in a resource-sensitive manner. The system state can include a current CPU usage associated with processors of the data generation platform. Based on the system state, the data generation platform can calculate a threshold metric value that indicates an allotment of system resources available for generating an output based on the prompt. The data generation platform can determine the estimated performance metric value associated with generating the output using the user's selected machine learning model (e.g., LLM). In response to determining that the estimated performance metric value satisfies the threshold metric value, the data generation platform can provide the prompt to the selected model (e.g., LLM) for generation of the requested output and subsequent transmission to a system that enables the user to view the output. When the estimated performance metric value does not satisfy the threshold metric value, the data generation platform can determine another model (e.g., a second LLM) for generation of the output.

As such, the disclosed data generation platform enables flexible, secure, and modular control over the use of LLMs to generate outputs. By evaluating the system effects associated with processing an input (e.g., a natural language prompt) using an LLM to generate an output, the data generation platform can mitigate adverse effects associated with system overuse (e.g., CPU overclocking or cost overruns). Furthermore, by redirecting the prompt to an appropriate model (e.g., such that the predicted system resource use is within expected or allowed bounds), the data generation platform enables the generation of outputs in a resilient, flexible manner, such that inputs are dynamically evaluated in light of changing system conditions (e.g., changing values of CPU usage, bandwidth, or incurred cost).

The inventors have also developed a system for evaluating model outputs in an isolated environment to mitigate errors and security breaches. For example, the data generation platform determines whether an output from a machine learning model, such as an LLM, includes particular types of data (e.g., including software-related information, such as a code sample, code snippet, or an executable program). In such cases, the data generation platform can provide the generated output to a parameter generation model (e.g., an LLM) configured to generate validation test parameters to validate the nature of the output data (e.g., the generated code). For example, using the parameter generation model, the platform generates compilation instructions for an appropriate programming language, where the compilation instructions identify or locate a compiler for compiling a set of executable instructions based on the generated code.

The parameter generation model can generate a virtual machine configuration for testing the behavior of the executable instructions. For example, the data generation platform determines an indication of a simulated hardware configuration for a virtual environment in which to test and host the compiled instructions, including a processor architecture and/or memory/storage limits associated with the virtual environment. In some implementations, the data generation platform determines a software configuration for the virtual environment, including an operating system and/or associated environment variables (e.g., directory structures and/or relevant filepaths). The data generation platform can generate the virtual environment (e.g., within a virtual machine) according to the virtual machine configuration to enable compilation of the generated code within an isolated environment (e.g., a "sandcastle") for testing the code.

The disclosed data generation platform enables the flexible evaluation of output in an application-specific manner. To illustrate, the data generation platform can configure a validation test for evaluating code generated from an LLM based on information within the prompt provided to the LLM and the nature of the output of the LLM. Furthermore, the data generation platform can configure the test environment (e.g., a virtual machine environment) depending on the applicability of the generated code or nature of the input and/or user. By monitoring test outputs from compiled code generated by a machine learning model (e.g., an LLM), the data generation platform enables mitigation of errors, software bugs, or other unintended system effects.

For example, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Gaps represent situations where an expected control is either absent or not functioning properly, such as the failure to establish a specific framework within an organization. Operative standards contain controls that can be based on publications such as regulations, organizational guidelines, best practice guidelines, and others. Using manual processes heavily depends on individual knowledge and thus poses a significant risk for potential bias. This subjectivity can result in inconsistent mappings, as different individuals may understand and apply operative standards such as regulatory requirements in varied ways. Further, the sheer volume of identified gaps complicates traditional compliance efforts. Manually managing such a vast number of gaps is not only labor-intensive but also prone to oversights. Another significant disadvantage of traditional methods is the static nature of the mapping process. Conventional approaches often fail to account for the dynamic and evolving nature of regulatory requirements and organizational controls. When the interpretations of operative standards change, the mappings need to be manually reviewed and updated, which can delay compliance efforts and increase the risk of non-compliance.

As such, the inventors have further developed a system to use generative AI (e.g., GAI, GenAI, generative artificial intelligence) models, such as a large language model (LLM) in the above-described data generation platform, to map gaps in controls to corresponding operative standards. The system determines a set of vector representations of alphanumeric characters represented by one or more operative standards, which contain a first set of actions adhering to constraints in the set of vector representations. The system receives, via a user interface, an output generation request that includes an input with a set of gaps associated with scenarios failing to satisfy operative standards of the set of vector representations, each scenario being associated with a unique identifier and corresponding metrics indicating actions in the first set of actions absent from the scenario. Each gap in the set of gaps includes attributes defining the scenario, such as the unique identifier of the scenario, the corresponding metrics, the corresponding vector representations, a title, a summary, and/or a severity level. Using the received input, the system constructs a set of prompts for each gap, where the set of prompts for a particular gap includes the set of attributes defining the scenario and the first set of actions of the operative standards. Each prompt can compare the corresponding gap against the first set of actions of the operative standards or the set of vector representations. For each gap, the system maps the gap to one or more operative standards of the set of vector representations by supplying the prompt into the LLM and, in response, receiving from the LLM a gap-specific set of operative standards that include the operative standards associated with the particular gap.

Using a generative AI model to map gaps in controls to corresponding operative standards creates a more objective and consistent approach. The system, as compared to conventional approaches, reduces reliance on individual knowledge, thus minimizing personal biases and resulting in more uniform mappings across different individuals and teams. By standardizing the mapping process, the invention improves the accuracy and consistency of the mappings by ensuring that all relevant details are properly aligned with the applicable standards. Additionally, the system can efficiently handle the large volumes of gaps that organizations face, significantly reducing the labor-intensive nature of manual reviews.

In another example, conventional approaches to identifying actionable items from guidelines present several challenges. Typically, conventional methods include either human reviewers or automated systems processing guidelines in a linear fashion. The conventional linear approach often leads to an overwhelming number of actionable items being identified, as the conventional linear approach involves parsing documents (e.g., of the guidelines) word by word or through keyword searches. Such methods are unable to discern the most relevant and common actionable items, resulting in a vast and often unmanageable list of requirements that can be redundant or overly detailed.

Furthermore, conventional approaches lack the ability to dynamically adapt to changes in guidelines over time. When new guidelines are introduced or existing ones are updated, conventional systems typically simply add new actionable items without reassessing the overall set of actionable items to ensure that the new actionable items are not redundant or contradictory to previously set actionable items. The conventional approach further fails to account for subtle shifts in interpretation that may arise from changes in definitions or regulatory language, potentially leading to outdated or irrelevant requirements remaining on the list. Consequently, organizations may end up with an inflated and confusing set of actionable items that do not accurately reflect the current landscape of the guidelines (e.g., the current regulatory landscape).

Additionally, conventional approaches do not effectively address the issue of evolving interpretations of existing regulations. Even without new guidelines, shifts in how certain regulations are understood can result in new actionable items. Conventional methods do not reevaluate existing requirements in light of the interpretation shifts, which can lead to gaps in compliance and missed obligations. The inability to capture and adapt to nuanced changes in guidelines can expose organizations to compliance risks and inefficiencies.

As such, the inventors have further developed a system to use generative AI models, such as an LLM in the above-described data generation platform, to identify actionable items from guidelines. The system receives, from a user interface, an output generation request that includes an input for generating an output using a large-language model (LLM). The input consists of guidelines that represent operative standards associated with a first set of actions, which are configured to adhere to the constraints of the guidelines. The guidelines are then partitioned into multiple text subsets based on predetermined criteria, such as the length or complexity of each text subset. Using the partitioned guidelines, the system constructs a set of prompts for each text subset. The prompts can include the guidelines, a set of pre-loaded query contexts defining the first set of actions, a set of keywords associated with the textual content of the corresponding vector representations, and/or the text subset itself.

Each text subset can be mapped to one or more actions in the first set of actions by supplying one or more prompts of the set of prompts of the particular vector representation into the LLM. In response to supplying the one or more prompts, the LLM generates a second set of actions including one or more actions associated with the particular text subset of the guidelines. Subsequent actions in this second set can be generated based on previous actions. The system then generates a third set of actions by aggregating the corresponding second set of actions for each text subset. In some implementations, the system generates a layout for display at the user interface that indicates the third set of actions associated with the guidelines. The layout can include a first representation of the guidelines and a second representation of the third set of actions.

In some implementations, the same LLM or different AI model can compare the third set of actions with a fourth set of actions defined by a current set of operative standards (e.g., Reference Control Operations, current organizational standards, current set of actionable items) by identifying gaps between 1) the third set of actions (e.g., AI model-generated list of actionable items) and 2) the fourth set of actions (e.g., current organizational list of actionable items) and determine discrepancies between the two sets of actions. Once gaps are identified, the AI model can further classify gaps as material risk gaps (e.g., related to new actions found in the third set of actions that are absent from the fourth set), rewording gaps (e.g., discrepancies related to the wording of the actions), or no gaps. If a material risk gap is identified, one or more actions can be added to the fourth set of actions and/or automatically executed to remedy the gap.

Using a generative AI model as described to identify actionable items from guidelines offers a more reliable and dynamic approach. Unlike conventional linear processes that result in an overwhelming number of redundant actionable items, by heuristically analyzing guidelines, the system can identify common actionable items without the parsing through the guideline documents word by word. The disclosed system reduces the number of identified actionable items to only relevant actionable items. Moreover, the system's dynamic and context-aware nature allows the system to respond to changes in guidelines over time by reassessing and mapping shifts in actionable items as the shifts occur. For example, the system can remove non-relevant actionable items and/or replace actionable items due to shifts in existing guidelines.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

FIG. 1 shows an illustrative environment 100 for evaluating machine learning model inputs (e.g., language model prompts) and outputs for model selection and validation, in accordance with some implementations of the present technology. For example, the environment 100 includes the data generation platform 102, which is capable of communicating with (e.g., transmitting or receiving data to or from) a data node 104 and/or third-party databases 108a-108n via a network 150. The data generation platform 102 can include software, hardware, or a combination of both and can reside on a physical server or a virtual server (e.g., as described in FIG. 3) running on a physical computer system. For example, the data generation platform 102 can be distributed across various nodes, devices, or virtual machines (e.g., as in a distributed cloud server). In some implementations, the data generation platform 102 can be configured on a user device (e.g., a laptop computer, smartphone, desktop computer, electronic tablet, or another suitable user device). Furthermore, the data generation platform 102 can reside on a server or node and/or can interface with third-party databases 108a-108n directly or indirectly.

The data node 104 can store various data, including one or more machine learning models, prompt validation models, associated training data, user data, performance metrics and corresponding values, validation criteria, and/or other suitable data. For example, the data node 104 includes one or more databases, such as an event database (e.g., a database for storage of records, logs, or other information associated with LLM-related user actions), a vector database, an authentication database (e.g., storing authentication tokens associated with users of the data generation platform 102), a secret database, a sensitive token database, and/or a deployment database.

An event database can include data associated with events relating to the data generation platform 102. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 102 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 102). By doing so, the data generation platform 102 can store and track information relating to performance, errors, and troubleshooting. The data generation platform 102 can include one or more subsystems or subcomponents. For example, the data generation platform 102 includes a communication engine 112, an access control engine 114, a breach mitigation engine 116, a performance engine 118, and/or a generative model engine 120.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 102 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 102 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 102 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 102 can evaluate prompts and/or outputs to prevent breaches or leakage of such sensitive information.

A deployment database can include data associated with deploying, using, or viewing results associated with the data generation platform 102. For example, the deployment database can include a server system (e.g., physical or virtual) that stores validated outputs or results from one or more LLMs, where such results can be accessed by the requesting user.

The data generation platform 102 can receive inputs (e.g., prompts), training data, validation criteria, and/or other suitable data from one or more devices, servers, or systems. The data generation platform 102 can receive such data using communication engine 112, which can include software components, hardware components, or a combination of both. For example, the communication engine 112 includes or interfaces with a network card (e.g., a wireless network card and/or a wired network card) that is associated with software to drive the card and enables communication with network 150. In some implementations, the communication engine 112 can also receive data from and/or communicate with the data node 104, or another computing device. The communication engine 112 can communicate with the access control engine 114, the breach mitigation engine 116, the performance engine 118, and the generative model engine 120.

In some implementations, the data generation platform 102 can include the access control engine 114. The access control engine 114 can perform tasks relating to user/device authentication, controls, and/or permissions. For example, the access control engine 114 receives credential information, such as authentication tokens associated with a requesting device and/or user. In some implementations, the access control engine 114 can retrieve associated stored credentials (e.g., stored authentication tokens) from an authentication database (e.g., stored within the data node 104). The access control engine 114 can include software components, hardware components, or a combination of both. For example, the access control engine 114 includes one or more hardware components (e.g., processors) that are able to execute operations for authenticating users, devices, or other entities (e.g., services) that request access to an LLM associated with the data generation platform 102. The access control engine 114 can directly or indirectly access data, systems, or nodes associated with the third-party databases 108a-108n and can transmit data to such nodes. Additionally or alternatively, the access control engine 114 can receive data from and/or send data to the communication engine 112, the breach mitigation engine 116, the performance engine 118, and/or the generative model engine 120.

The breach mitigation engine 116 can execute tasks relating to the validation of inputs and outputs associated with the LLMs. For example, the breach mitigation engine 116 validates inputs (e.g., prompts) to prevent sensitive information leakage or malicious manipulation of LLMs, as well as validate the security or safety of the resulting outputs. The breach mitigation engine 116 can include software components (e.g., modules/virtual machines that include prompt validation models, performance criteria, and/or other suitable data or processes), hardware components, or a combination of both. As an illustrative example, the breach mitigation engine 116 monitors prompts for the inclusion of sensitive information (e.g., PII), or other forbidden text, to prevent leakage of information from the data generation platform 102 to entities associated with the target LLMs. The breach mitigation engine 116 can communicate with the communication engine 112, the access control engine 114, the performance engine 118, the generative model engine 120, and/or other components associated with the network 150 (e.g., the data node 104 and/or the third-party databases 108a-108n).

The performance engine 118 can execute tasks relating to monitoring and controlling performance of the data generation platform 102 (e.g., or the associated development pipeline). For example, the performance engine 118 includes software components (e.g., performance monitoring modules), hardware components, or a combination thereof. To illustrate, the performance engine 118 can estimate performance metric values associated with processing a given prompt with a selected LLM (e.g., an estimated cost or memory usage). By doing so, the performance engine 118 can determine whether to allow access to a given LLM by a user, based on the user's requested output and the associated estimated system effects. The performance engine 118 can communicate with the communication engine 112, the access control engine 114, the performance engine 118, the generative model engine 120, and/or other components associated with the network 150 (e.g., the data node 104 and/or the third-party databases 108a-108n).

The generative model engine 120 can execute tasks relating to machine learning inference (e.g., natural language generation based on a generative machine learning model, such as an LLM). The generative model engine 120 can include software components (e.g., one or more LLMs, and/or API calls to devices associated with such LLMs), hardware components, and/or a combination thereof. To illustrate, the generative model engine 120 can provide users' prompts to a requested, selected, or determined model (e.g., LLM) to generate a resulting output (e.g., to a user's query within the prompt). As such, the generative model engine 120 enables flexible, configurable generation of data (e.g., text, code, or other suitable information) based on user input, thereby improving the flexibility of software development or other such tasks. The generative model engine 120 can communicate with the communication engine 112, the access control engine 114, the performance engine 118, the generative model engine 120, and/or other components associated with the network 150 (e.g., the data node 104 and/or the third-party databases 108a-108n).

Engines, subsystems, or other components of the data generation platform 102 are illustrative. As such, operations, subcomponents, or other aspects of particular subsystems of the data generation platform 102 can be distributed, varied, or modified across other engines. In some implementations, particular engines can be deprecated, added, or removed. For example, operations associated with breach mitigation are performed at the performance engine 118 instead of at the breach mitigation engine 116.

Suitable Computing Environments

Figure 2:
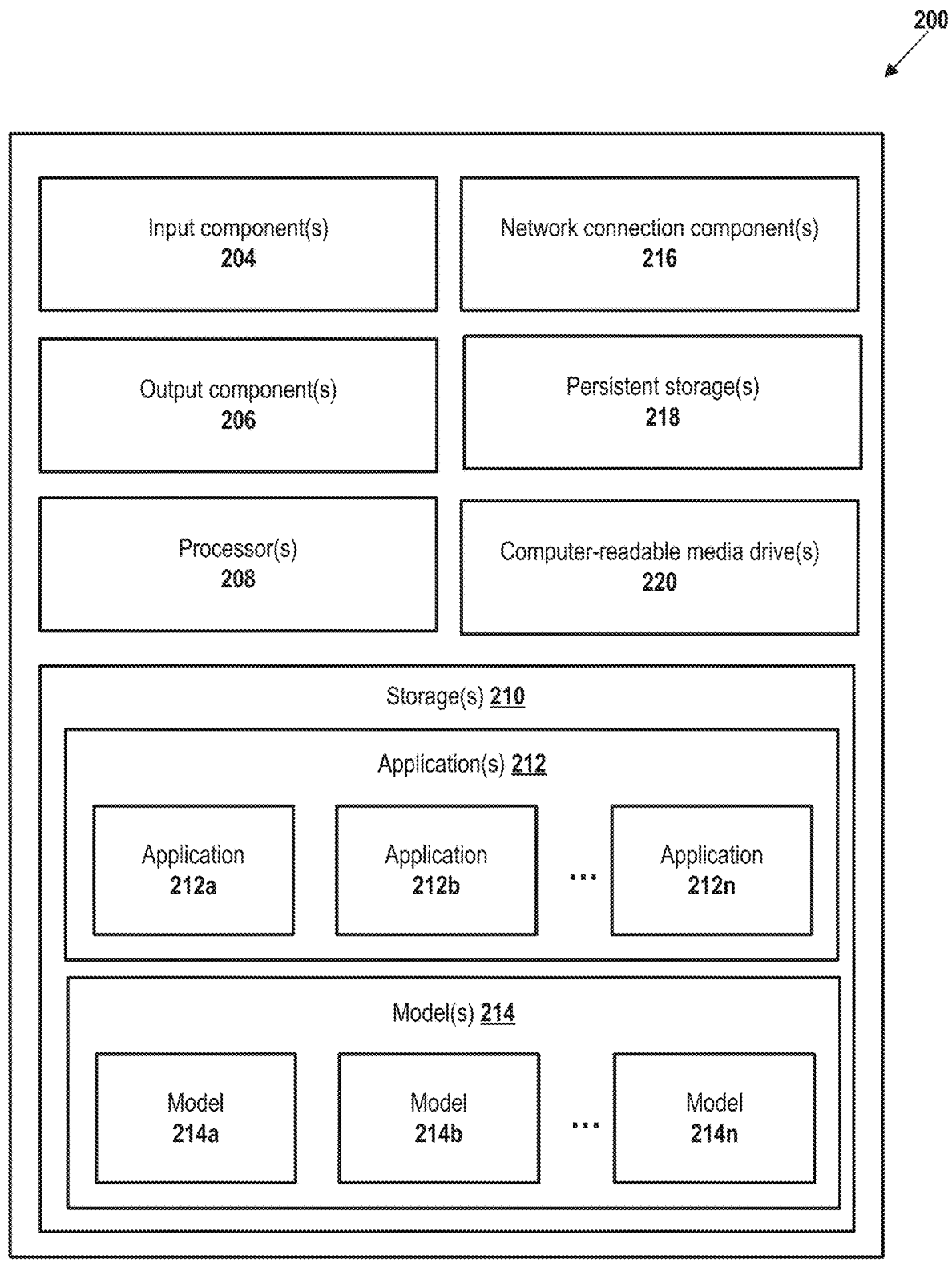
FIG. 2 shows a block diagram showing some of the components typically incorporated in at least some of the computer systems and other devices on which the disclosed system operates in accordance with some implementations of the present technology.

FIG. 2 shows a block diagram showing some of the components typically incorporated in at least some of the computer systems and other devices 200 on which the disclosed system (e.g., the data generation platform 102) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
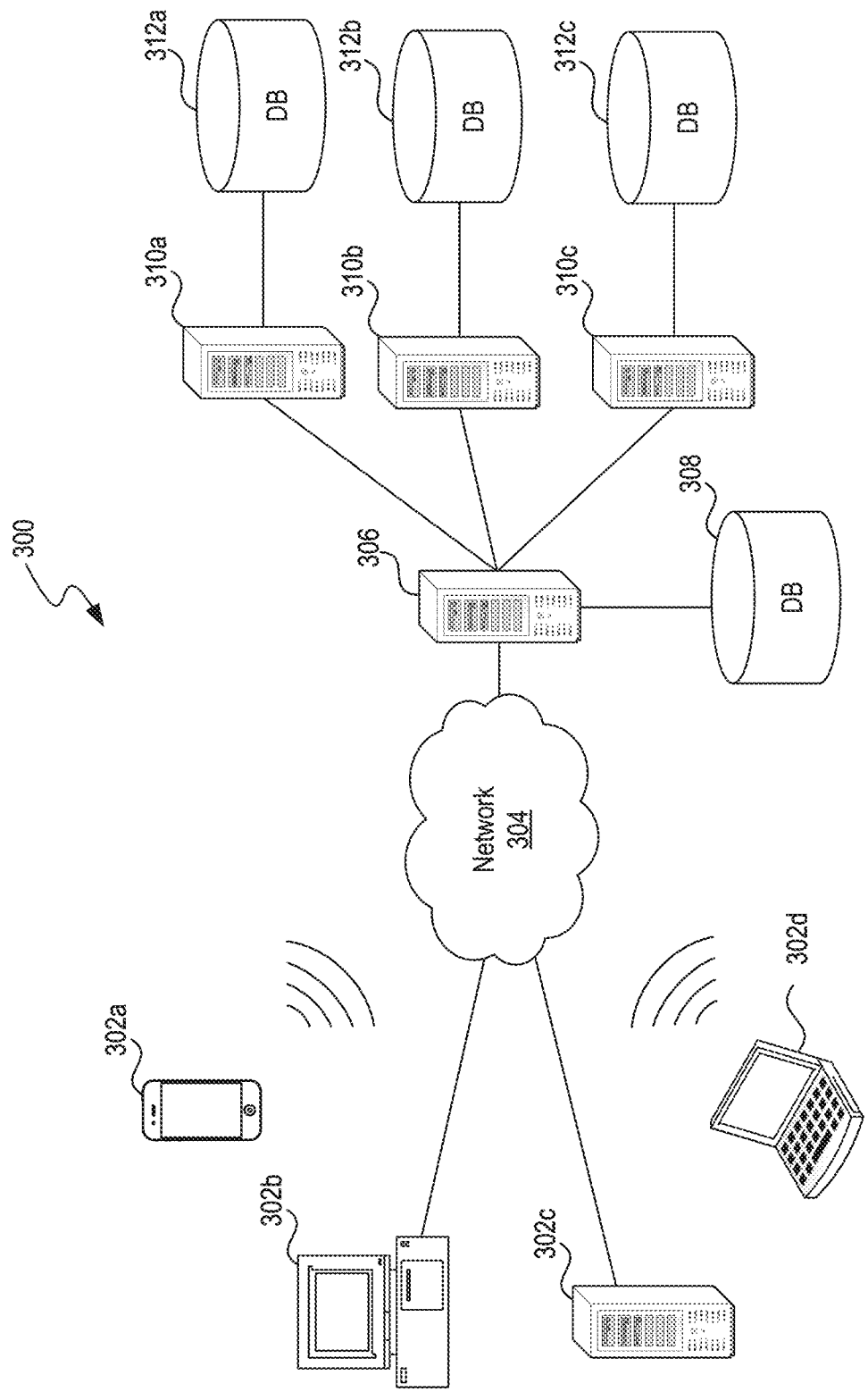
FIG. 3 is a system diagram illustrating an example of a computing environment in which the disclosed system operates in some implementations of the present technology.

FIG. 3 is a system diagram illustrating an example of a computing environment 300 in which the disclosed system operates in some implementations of the present technology. In some implementations, environment 300 includes one or more client computing devices 302a-302d, examples of which can host graphical user interfaces associated with client devices. For example, one or more of the client computing devices 302a-302d includes user devices and/or devices associated with services requesting responses to queries from LLMs. Client computing devices 302 operate in a networked environment using logical connections through network 304 (e.g., the network 150) to one or more remote computers, such as a server computing device (e.g., a server system housing the data generation platform 102 of FIG. 1). In some implementations, client computing devices 302 can correspond to device 200 (FIG. 2).

In some implementations, server computing device 306 is an edge server that receives client requests and coordinates fulfillment of those requests through other servers, such as server computing devices 310a-310c. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-310c) connect to a corresponding database (308, 312a-312c). For example, the corresponding database includes a database stored within the data node 104 (e.g., a sensitive token database, an event database, or another suitable database). As discussed above, each server computing device 310 can correspond to a group of servers, and each of these servers can share a database or can have its own database (and/or interface with external databases, such as third-party databases 108a-108n). In addition to information described concerning the data node 104 of FIG. 1, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 150) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Data Generation Platform

Figure 4:
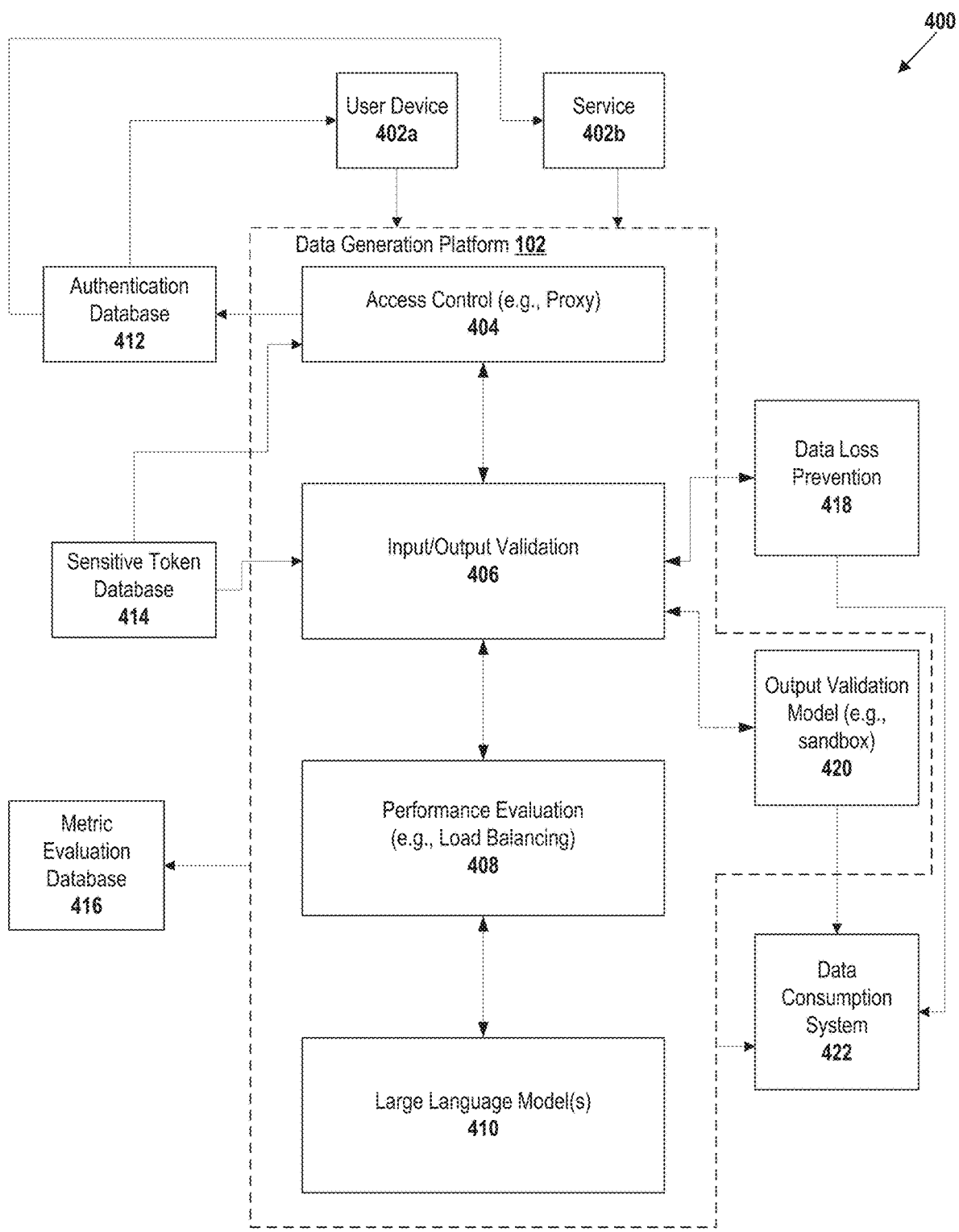
FIG. 4 is a schematic illustrating a process for validating model inputs and outputs, in accordance with some implementations of the present technology.

FIG. 4 is a schematic illustrating a process 400 for validating model inputs and outputs, in accordance with some implementations of the present technology. For example, a user device 402a or a service 402b provides an output generation request (e.g., including an input, such as a prompt, and an authentication token) to the data generation platform 102 (e.g., to the access control engine 114 for access control 404 via the communication engine 112 of FIG. 1). The access control engine 114 can authenticate the user device 402a or service 402b by identifying stored tokens within an authentication database 412 that match the provided authentication token. The access control engine 114 can communicate the prompt to the breach mitigation engine 116 for input/output validation 406. The breach mitigation engine 116 can communicate with a sensitive token database 414 and/or a data-loss prevention engine 418, and/or an output validation model 420 for validation of prompts and/or LLM outputs. Following input validation, the performance engine 118 can evaluate the performance of LLMs to route the prompt to an appropriate LLM (e.g., large language model(s) 410). The data generation platform 102 can transmit the generated output to the output validation model 420 for testing and validation of the output (e.g., to prevent security breaches). The output validation model 420 can transmit the validated output to a data consumption system 422, for exposure of the output to the user device 402a and/or the service 402b. In some implementations, the data generation platform 102 can transmit metric values, records, or events associated with the data generation platform 102 to a metric evaluation database 416 (e.g., an event database) for monitoring, tracking, and evaluation of the data generation platform 102.

A user device (e.g., the user device 402a) and/or a module, component, or service of a development pipeline (e.g., a service 402b) can generate and transmit an output generation request to the data generation platform 102 (e.g., via the communication engine 112 of FIG. 1). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from an LLM). The prompt can include a natural language question or command (e.g., in English). For example, the prompt includes a request for an LLM to generate code (e.g., within a specified programming language) that executes a particular operation. Additionally or alternatively, a prompt includes a data processing request, such as a request to extract or process information of a database (e.g., associated with one or more of the third-party databases 108a-108n). The output generation request can be transmitted to the data generation platform 102 using an API call to an API associated with the data generation platform 102 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the data generation platform disclosed herein enable inputs of various formats or combinations thereof.

Figure 5:
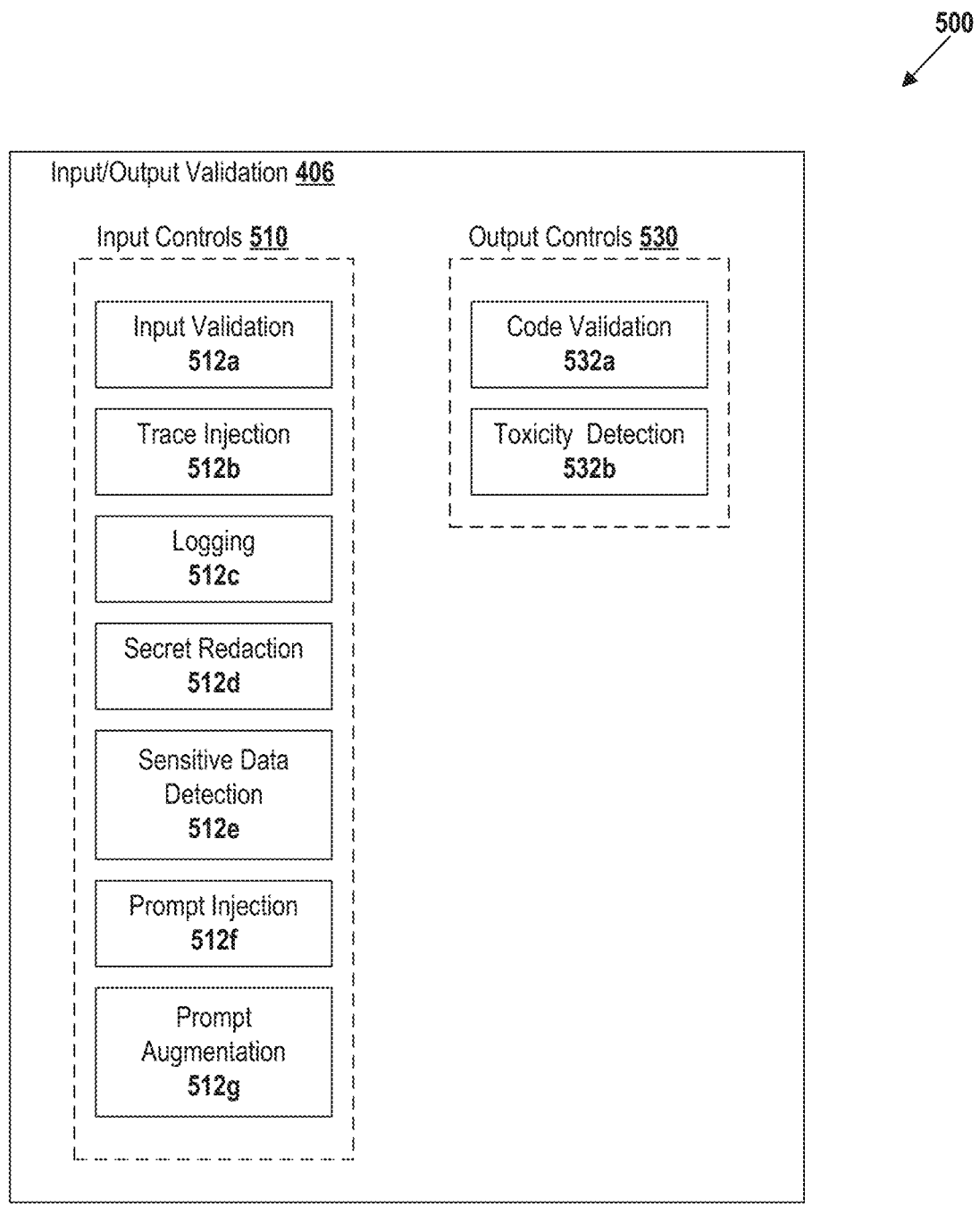
FIG. 5 shows a schematic illustrating components of input/output validation, in accordance with some implementations of the present technology.

FIG. 5 shows a schematic 500 illustrating components of input/output validation, in accordance with some implementations of the present technology. For example, input/output validation 406 (e.g., through breach mitigation engine 116) includes input controls 510 (e.g., associated with prompt validation) that include one or more prompt validation models. The input/output validation 406 can additionally or alternatively include output controls 530, as discussed below. Modules, components, or models associated with the input/output validation 406 can be updated, modified, added, removed, activated, or deactivated (e.g., according to attributes of the output generation request, a classification of the user, or other suitable factors). Thus the breach mitigation engine 116 (and the data generation platform 102) are flexible, modular, and configurable in an application-specific manner.

A prompt (e.g., input) validation model can include a module (e.g., a software component), model, algorithm, or process for validating, authenticating, modifying, and/or controlling inputs (e.g., to LLMs). For example, a prompt validation model includes one or more input controls 510, as shown in FIG. 5. Additionally or alternatively, the input controls 510 can include one or more prompt validation models capable of executing operations including input validation 512a, trace injection 512b, logging 512c, secret redaction 512d, sensitive data detection 512e, prompt injection 512f, and/or prompt augmentation 512g. A prompt validation model can generate a validation indicator. The validation indicator can indicate a validation status (e.g., a binary indicator specifying whether the prompt is suitable for provision to the associated LLM). Additionally or alternatively, the validation indicator can indicate or specify aspects of the prompt that are validated and/or invalid, thereby enabling further modification to cure any associated deficiencies in the prompt.

Process for Validating LLM Inputs and Outputs

Figure 6:
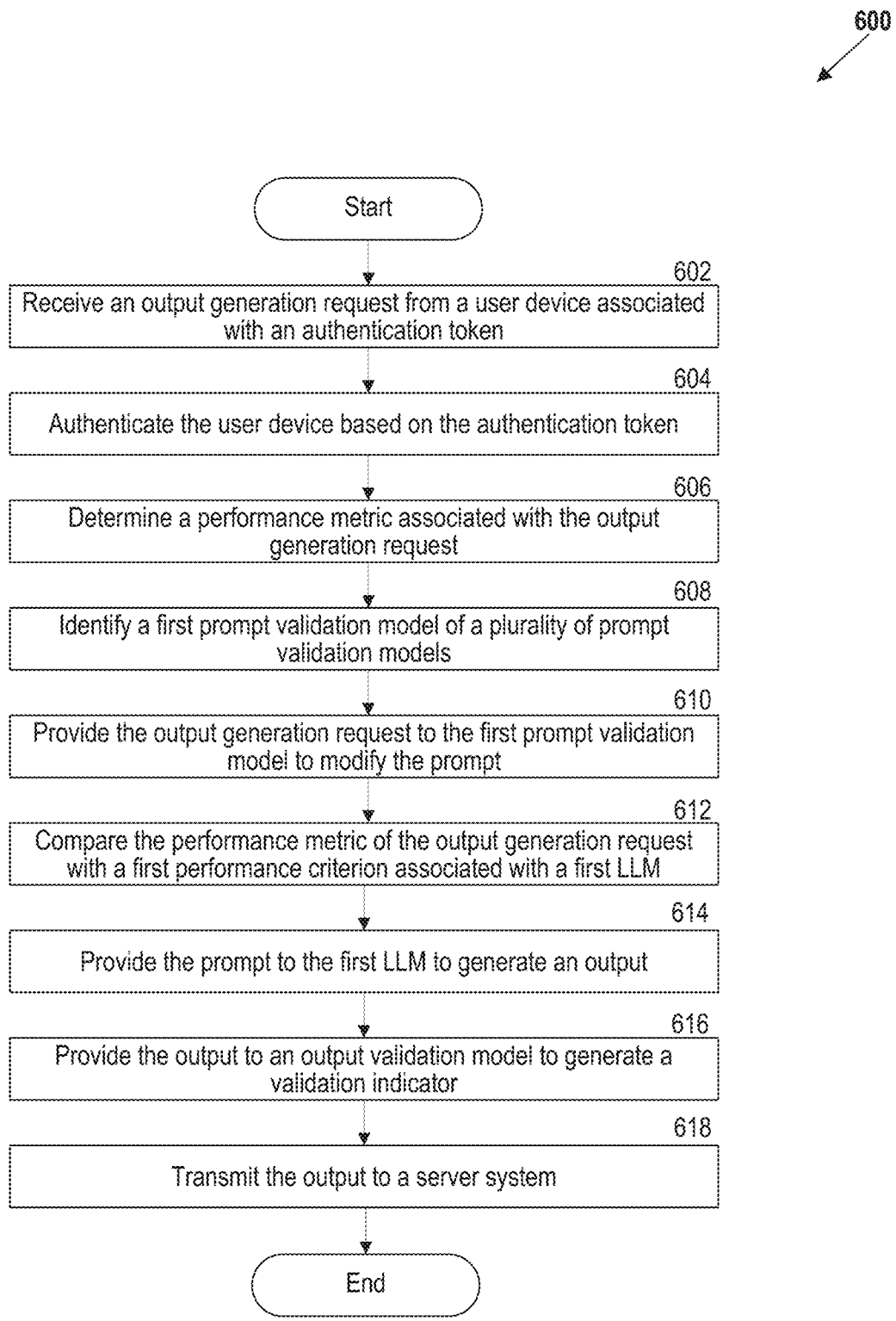
FIG. 6 shows a flow diagram illustrating a process for evaluating natural language prompts for model selection and for validating generated responses, in accordance with some implementations of the present technology.

FIG. 6 shows a flow diagram illustrating a process 600 for the dynamic evaluation of large-language model prompts and validation of the resulting outputs, in accordance with some implementations of the present technology. For example, the process 600 is used to generate data and/or code for in the context of data processing or software development pipelines.

At act 602, process 600 can receive an output generation request from a user device (e.g., where the user device is associated with an authentication token). For example, the data generation platform 102 receives an output generation request from a user device, where the user device is associated with an authentication token, and where the output generation request includes a prompt for generation of a text-based output using a first large-language model (LLM). As an illustrative example, the data generation platform 102 receives a request from a user, through a computing device, indicating a query to request the generation of code for a software application. The request can include a user identifier, such as a username, as well as a specification of a particular requested LLM architecture. By receiving such a request, the data generation platform 102 can evaluate the prompt and generate a resulting output in an efficient, secure manner.

In some implementations, process 600 can generate an event record that describes the output generation request. For example, the data generation platform 102 generates, based on the output generation request, an event record including the performance metric value, a user identifier associated with the user device, and the prompt. The data generation platform 102 can transmit, to the server system, the event record for storage in an event database. As an illustrative example, the data generation platform 102 can generate a log of requests from users for generation of outputs (e.g., including the user identifier and associated timestamp). By doing so, the data generation platform 102 can track, monitor, and evaluate the use of system resources, such as LLMs, thereby conferring improved control to system administrators to improve the effectiveness of troubleshooting and system resource orchestration.

At act 604, process 600 can authenticate the user. For example, the data generation platform 102 authenticates the user device based on the authentication token (e.g., credentials associated with the output generation request). As an illustrative example, the data generation platform 102 can identify the user associated with the output generation request and determine whether the user is allowed to submit a request (e.g., and/or whether the user is allowed to select an associated LLM). By evaluating the authentication status of the user, the data generation platform 102 can protect the associated software development pipeline from malicious or unauthorized use.

In some implementations, process 600 can compare the authentication token with a token stored within an authentication database in order to authenticate the user. For example, the data generation platform 102 determines a user identifier associated with the user device. The data generation platform 102 can determine, from a token database, a stored token associated with the user identifier. The data generation platform 102 can compare the stored token and the authentication token associated with the output generation request. In response to determining that the stored token and the authentication token associated with the output generation request match, the data generation platform 102 can authenticate the user device. As an illustrative example, the data generation platform 102 can compare a first one-time password assigned to a user (e.g., as stored within an authentication database) with a second one-time password provided along with the authentication request. By confirming that the first and second passwords match, the data generation platform 102 can ensure that the user submitting the output generation request is authorized to interact to use the requested LLMs.

At act 606, process 600 can determine a performance metric value associated with the output generation request. For example, the data generation platform 102 determines a performance metric value associated with the output generation request, where the performance metric value indicates an estimated resource requirement for the output generation request. As an illustrative example, the data generation platform 102 can determine an estimated memory usage associated with the output generation request (e.g., an estimated memory size needed by the associated LLM to generate the requested output based on the input prompt). By doing so, the data generation platform 102 can determine the load or burden on the system associated with the user's request, thereby enabling the data generation platform 102 to evaluate and suggest resource use optimization strategies to improve the efficiency of the associated development pipeline.

At act 608, process 600 can identify a prompt validation model, for validation of the output generation request, based on an attribute of the request. For example, the data generation platform 102 identifies, based on an attribute of the output generation request, a first prompt validation model of a plurality of prompt validation models (e.g., of a set of input controls). As an illustrative example, the data generation platform 102 can determine a technical application or type of requested output associated with the prompt. The attribute can include an indication that the prompt is requesting code (e.g., for software development purposes). Based on this attribute, the data generation platform 102 can determine a prompt validation model (e.g., an input control) that is suitable for the given prompt or output generation request. By doing so, the data generation platform 102 enables tailored, flexible, and modular controls or safety checks on prompts provided by users, thereby improving the efficiency of the system will targeting possible vulnerabilities in a prompt-specific manner.

At act 610, process 600 can provide the output generation request to the identified model for modification of the prompt. For example, the data generation platform 102 provides the output generation request to the first prompt validation model to modify the prompt. As an illustrative example, the data generation platform 102 can execute one or more input controls to evaluate the prompt, including trace injection, prompt injection, logging, secret redaction, sensitive data detection, prompt augmentation, or input validation. By doing so, the data generation platform 102 can improve the accuracy, security, and stability of prompts that are subsequently provided to LLMs, thereby preventing unintended data leakage (e.g., of sensitive information), malicious prompt manipulation, or other adverse effects.

In some implementations, process 600 can replace or hide sensitive data within the user's prompt. For example, the data generation platform 102 determines that the prompt includes a first alphanumeric token. The data generation platform 102 can determine that one or more records in a sensitive token database include a representation of the first alphanumeric token. The data generation platform 102 can modify the prompt to include a second alphanumeric token in lieu of the first alphanumeric token, where the sensitive token database does not include a record representing the second alphanumeric token. As an illustrative example, the data generation platform 102 can detect that the prompt includes sensitive information (e.g., PII), such as users' personal names, social security numbers, or birthdays. By masking such information, the data generation platform 102 can ensure that such sensitive information is not leaked to or provided to external systems (e.g., via an API request to an externally-housed LLM), thereby mitigating security breaches associated with LLM use.

In some implementations, process 600 can remove forbidden tokens from the user's prompt. For example, the data generation platform 102 determines that the prompt includes a forbidden token. The data generation platform 102 can generate the modified prompt by omitting the forbidden token. As an illustrative example, the data generation platform 102 can determine whether the user's prompt includes inappropriate or impermissible tokens, such as words, phrases, or sentences that are associated with swear words. The data generation platform 102 can mask or replace such inappropriate tokens, thereby improving the quality of inputs to the target LLM and preventing unintended or undesirable outputs as a result.

In some implementations, process 600 can inject a trace token into the user's prompt to improve model evaluation and tracking capabilities. For example, the data generation platform 102 can generate a trace token comprising a traceable alphanumeric token. The data generation platform 102 can generate the modified prompt to include the trace token. As an illustrative example, the data generation platform 102 can inject (e.g., by modifying the prompt to include) tokens, such as characters, words, or phrases, that are designed to enable tracking, evaluation, or monitoring of the prompt any resulting outputs. By doing so, the data generation platform 102 enables evaluation and troubleshooting with respect to LLM outputs (e.g., to detect or prevent prompt manipulation or interception of the prompt or output by malicious actors).

At act 612, process 600 can compare the performance metric value with a performance criterion (e.g., a threshold metric value) that is related to the LLM associated with the output generation request. For example, the data generation platform 102 compares the performance metric value of the output generation request with a first performance criterion associated with the first LLM of a plurality of LLMs. As an illustrative example, the data generation platform 102 can compare a requirement of system resources for execution of the LLM using the given prompt with a threshold value (e.g., as associated with the LLM, the user, and/or the attribute of the output generation request). For example, the data generation platform 102 can compare an estimated system memory usage for use of the LLM with an available system memory availability to determine whether the LLM can be used without adversely affecting the associated computing system. By doing so, the data generation platform 102 can prevent unintended system-wide issues regarding resource use.

In some implementations, process 600 can generate a cost metric value and determine whether the cost metric value satisfies a threshold cost (e.g., a threshold associated with the performance criterion). For example, the data generation platform 102 generates a cost metric value associated with the estimated resource requirement for the output generation request. The data generation platform 102 can determine a threshold cost associated with the first LLM. The data generation platform 102 can determine that the cost metric value satisfies the threshold cost. As an illustrative example, the data generation platform 102 can determine a monetary cost associated with running the LLM with the requested prompt. Based on determining that the cost is greater than a threshold cost (e.g., a remaining budget within the user's allotment), the data generation platform 102 can determine not to provide the prompt to the LLM. Additionally or alternatively, the data generation platform 102 can determine that the cost is less than the threshold cost and, in response to this determination, proceed to provide the prompt to the LLM. By doing so, the data generation platform 102 provides improved flexibility and/or control over the use of system resources (including memory, computational, and/or financial resources), enabling optimization of the associated development pipeline.

At act 614, process 600 can provide the prompt (e.g., as modified by suitable prompt validation models) to the LLM generate the requested output. For example, in response to determining that the performance metric satisfies the first performance criterion, the data generation platform 102 provides the prompt to the first LLM to generate an output. As an illustrative example, the data generation platform 102 can generate a vector representation of the prompt (e.g., using a vectorization system and/or the vector database) and provide the vector representation to a transformer model and/or a neural network associated with an LLM (e.g., through an API call). By doing so, the data generation platform 102 can generate a resulting output (e.g., generated code or natural language data) in response to a query submitted by the user within the prompt.

At act 616, process 600 can validate the output from the LLM. For example, the data generation platform 102 provides the output to an output validation model to generate a validation indicator associated with the output. As an illustrative example, the data generation platform 102 can validate the output of the LLM to prevent security breaches or unintended behavior. For example, the data generation platform 102 can review output text using a toxicity detection model and determine an indication of whether the output is valid or invalid. In some implementations, the data generation platform 102 can determine a sentiment associated with the output and modify the output (e.g., by resubmitting the output to the LLM) to modify the sentiment associated with the output. By doing so, the data generation platform 102 can ensure the accuracy, utility, and reliability of generated data.

In some implementations, process 600 can validate the output by generating and testing an executable program compiled on the basis of the output. For example, the data generation platform 102 extracts a code sample from the output, where the code sample includes code for a software routine. The data generation platform 102 can compile, within a virtual machine of the system, the code sample to generate an executable program associated with the software routine. The data generation platform 102 can execute, within the virtual machine, the software routine using the executable program. The data generation platform 102 can detect an anomaly in the execution of the software routine. In response to detecting the anomaly in the execution of the software routine, the data generation platform 102 can generate the validation indicator to include an indication of the anomaly. As an illustrative example, the data generation platform 102 can generate a validation indicator based on determining that the output contains code and testing the code (and/or the compiled version of the code) in an isolated environment for potential adverse effects, viruses, or bugs. By doing so, the data generation platform 102 can ensure the safety and security of generated code, thereby protecting the software development pipeline from security breaches or unintended behavior.

At act 618, process 600 can enable access to the output by the user. For example, in response to generating the validation indicator, the data generation platform 102 transmits the output to a server system enabling access to the output by the user device. As an illustrative example, the data generation platform 102 can provide the output to a server that enables users to access the output data (e.g., through login credentials) for consumption of the data and/or use in other downstream applications. As such, the data generation platform 102 provides a robust, flexible, and modular way to validate LLM-generated content.

Figure 7:
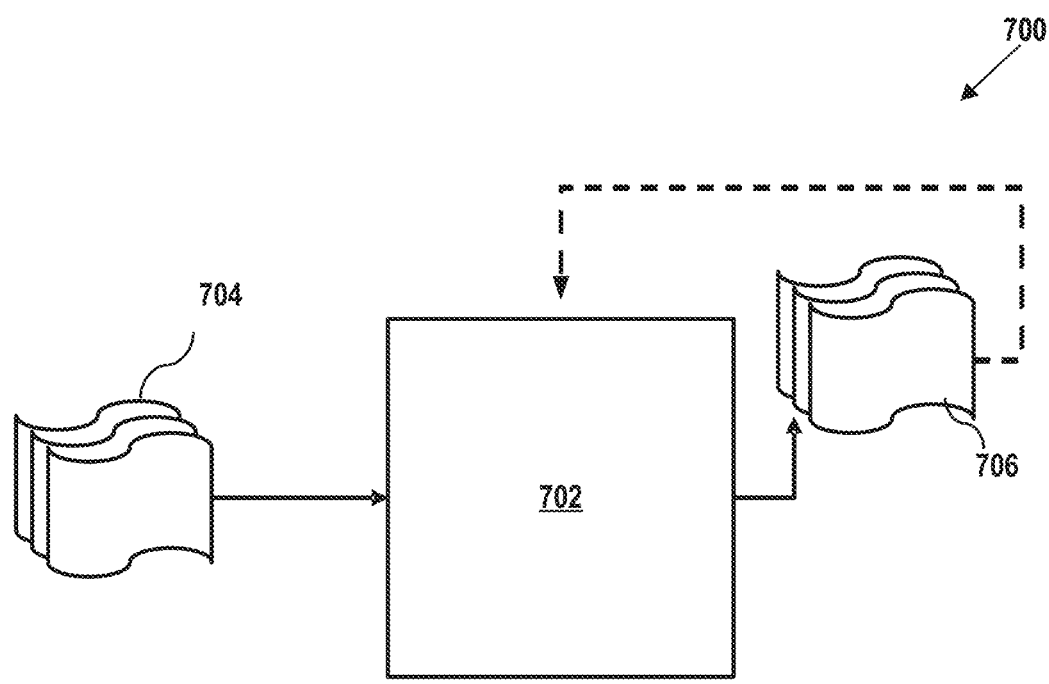
FIG. 7 shows a diagram of an artificial intelligence (AI) model, in accordance with some implementations of the present technology.

FIG. 7 shows a diagram of an AI model, in accordance with some implementations of the present technology. AI model 700 is shown. In some implementations, AI model 700 can be any AI model. In some implementations, AI model 700 can be part of, or work in conjunction with, server computing device 306 (FIG. 3). For example, server computing device 306 can store a computer program that can use information obtained from AI model 700, provide information to AI model 700, or communicate with AI model 700. In other implementations, AI model 700 can be stored in database 308 and can be retrieved by server computing device 306 to execute/process information related to AI model 700, in accordance with some implementations of the present technology.

In some implementations, AI model 700 can be a machine learning model 702. Machine learning model 702 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 7, machine learning model 702 can take inputs 704 and provide outputs 706. In one use case, outputs 706 can be fed back to machine learning model 702 as input to train machine learning model 702 (e.g., alone or in conjunction with user indications of the accuracy of outputs 706, labels associated with the inputs, or other reference feedback information). In another use case, machine learning model 702 can update its configurations (e.g., weights, biases, or other parameters) based on its assessment of its prediction (e.g., outputs 706) and reference feedback information (e.g., user indication of accuracy, reference labels, or other information). In another use case, where machine learning model 702 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 702 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Dynamic Model Selection for the Data Generation Platform

The data generation platform disclosed herein enables dynamic model selection for processing inputs (e.g., prompts) to generate associated outputs (e.g., responses to the prompts). For example, the data generation platform can redirect a prompt to a second LLM (e.g., distinct from the first LLM selected by the user within the output generation request). Additionally or alternatively, the data generation platform operates with other suitable machine learning model algorithms, inputs (e.g., including images, multimedia, or other suitable data), and outputs (e.g., including images, video, or audio). By doing so, the data generation platform 102 can mitigate adverse system performance (e.g., excessive incurred costs or overloaded memory devices or processors) by estimating system effects associated with the output generation request (e.g., the prompt) and generating an output using an appropriate model.

FIG. 8 shows a schematic of a data structure 800 illustrating a system state and associated threshold metric values, in accordance with some implementations of the present technology. For example, the data structure 800 includes usage values 804 and maximum values 806 for performance metrics 802. The data generation platform 102 can determine threshold metric values based on data associated with system performance (e.g., at the time of receipt of the output generation request). By doing so, the data generation platform 102 enables dynamic evaluation of requests for output generation, as well as dynamic selection of suitable models with which to process such requests.

As discussed in relation to FIG. 4 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 802, such as CPU usage, memory usage, hard disk space usage, a number of input tokens (e.g., system-wide, across one or more models associated with the data generation platform 102), and/or cost incurred. The data structure 800 corresponding to the system state can include usage values 804 and maximum values 806 associated with the respective performance metrics 802.

In some implementations, the data generation platform 102 determines a threshold metric value (e.g., of the threshold metric values 808 of FIG. 8) based on a usage value and maximum value for a corresponding performance metric (e.g., of performance metrics 802). For example, the data generation platform 102 determines a cost incurred up to a given point of time or within a predetermined time period associated with machine learning models of the data generation platform 102. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the data generation platform 102 can determine a threshold metric value associated with generating an output using the selected model based on the prompt.

For example, the data generation platform 102 determines the threshold metric value based on a difference between the usage value and the maximum value. The data generation platform 102 can determine a threshold metric value associated with a cost allowance for processing a prompt based on a difference between a maximum value (e.g., a maximum budget) and a usage value (e.g., a cost incurred). As such, the data generation platform 102 can handle situations where the system's performance metric changes over time.

In some implementations, the data generation platform 102 can determine or predict a threshold metric value based on providing the output generation request and the system state to a threshold evaluation model. For example, the data generation platform 102 can provide the input, the indication of a selected model, and information of the system state to the threshold evaluation model to predict a threshold metric value. To illustrate, the data generation platform 102 can predict a future system state (e.g., a time-series of performance metric values associated with the system) based on the output generation request, the current system state, and the selected model. The data generation platform 102 can estimate an elapsed time for the generation of output using the requested model; based on this elapsed time, the data generation platform 102 can determine a predicted system state throughout the output generation, thereby enabling more accurate estimation of the threshold metric value. The threshold evaluation model can be trained on historical system usage (e.g., performance metric value) information associated with previous output generation requests. As such, the data generation platform 102 enables the determination of threshold metric values on a dynamic, pre-emptive basis, thereby improving the ability of the data generation platform 102 to predict and handle future performance issues.

In some implementations, the system state is generated with respect to a particular user and/or group of users. For example, the data generation platform 102 determines a system state associated with a subset of resources assigned to a given user or group of users. To illustrate, the data generation platform 102 can determine a maximum cost value associated with output generation for a given user or subset of users of the data generation platform 102. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using LLMs by users of the group). As such, the data generation platform 102 can determine an associated threshold metric value that is specific to the particular associated users. By doing so, data generation platform 102 enables flexible, configurable requirements and limits to system resource usage based on the identity of users submitting prompts.

In some implementations, the data generation platform 102 determines an estimated performance metric value, as discussed in relation to FIG. 4. For example, the data generation platform 102 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., LLMs). For example, the performance metric evaluation model can generate an estimated cost value for processing a prompt using the first LLM to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the data generation platform 102 evaluates the suitability of a prompt for a given model based on comparing a composite metric value with a threshold composite value. For example, the data generation platform 102 generates a composite performance metric value based on a combination of performance metrics (e.g., the performance metrics 802 as shown in FIG. 8). To illustrate, the data generation platform 102 can generate a composite performance metric based on multiple performance metrics of the computing system associated with the machine learning models. Based on the metric, the data generation platform 102 can generate an estimated composite metric value corresponding to the composite metric (e.g., by calculating a product of values associated with the respective performance metrics) and compare the estimated composite metric value with an associated threshold metric value. As such, data generation platform 102 enables a more holistic evaluation of the effect of a given output generation request on system resources, thereby improving the accuracy and efficiency of the data generation platform 102 in selecting a suitable model. In some implementations, the data generation platform 102 can assign particular performance metrics a respective weight and calculate a value for the composite metric accordingly. Accordingly, the data generation platform 102 enables the prioritization of relevant performance metrics (e.g., cost) over other metrics (e.g., memory usage) according to system requirements.

Process for Validating Model Inputs and Outputs

Figure 9:
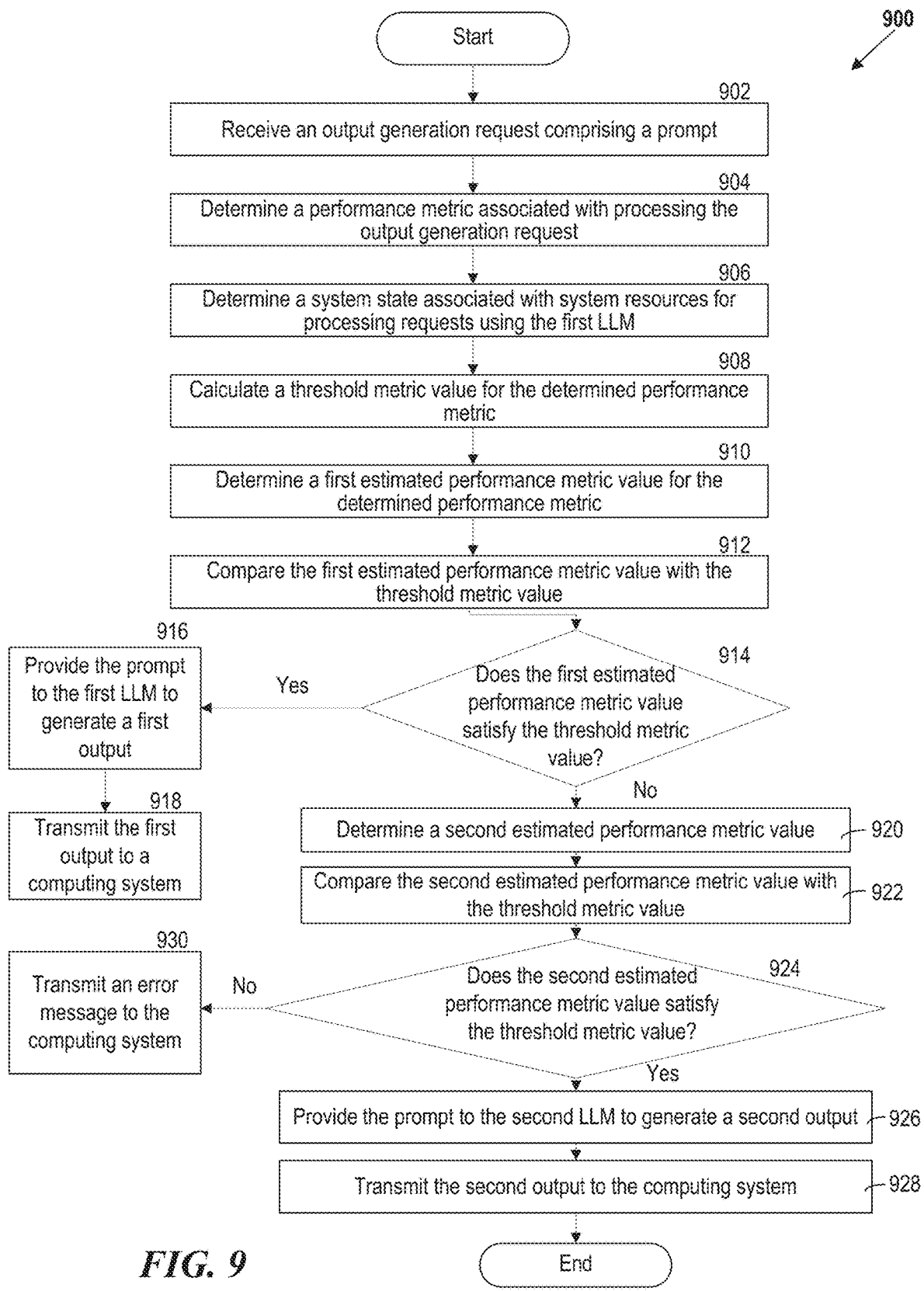
FIG. 9 shows a flow diagram illustrating a process for dynamic selection of models based on evaluation of user prompts, in accordance with some implementations of the present technology.

FIG. 9 shows a flow diagram illustrating a process 900 for dynamic selection of models based on evaluation of user inputs (e.g., prompts), in accordance with some implementations of the present technology. For example, the process 900 enables selection of an LLM for generation of an output (e.g., software-related code samples) based on an input (e.g., a text-based prompt) to prevent overuse of system resources (e.g., to ensure that sufficient system resources are available to process the request).

At act 902, the process 900 can receive an input for generation of an output using a model. For example, the process 900 receives, from a user device, an output generation request comprising an input (e.g., prompt) for generation of an output using a first model (e.g., an LLM) of a plurality of models. As an illustrative example, the data generation platform 102 (e.g., through the communication engine 112) receives a prompt indicating a desired output, such as a text-based instruction for the generation of software-related code samples (e.g., associated with a particular function). The output generation request can include an indication of a selected model (e.g., LLM) for processing the prompt. As such, the data generation platform 102 can evaluate the effect of generating an output using the selected model based on the prompt (e.g., or other suitable inputs) on the basis of the content or nature of the request (e.g., based on a user identifier associated with the request).

At act 904, the process 900 can determine a performance metric associated with processing the output generation request. For example, the process 900 determines a performance metric associated with processing the output generation request. As an illustrative example, the data generation platform 102 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with LLMs. In some implementations, the data generation platform 102 (e.g., through the performance engine 118) determines multiple performance metrics (e.g., associated with the system state) for evaluation of the effects (e.g., of generating an output based on the prompt) on the system.

At act 906, the process 900 can determine a system state associated with system resources. For example, the process 900 determines a system state associated with system resources for processing requests using the first model of the plurality of models. As an illustrative example, the performance engine 118 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the data generation platform 102, through communication engine 112 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the data generation platform 102 can evaluate the received prompt to determine whether the selected model is suitable for generating an associated output.

At act 908, the process 900 can calculate a threshold metric value (e.g., associated with the output generation request). For example, the process 900 calculate, based on the system state, a threshold metric value for the determined performance metric. As an illustrative example, the data generation platform 102 (e.g., through the performance engine 118) determines an indication of computational or monetary resources available for processing the input or prompt (e.g., to generate an associated output). The data generation platform 102 can determine an available budget (e.g., a threshold cost metric) and/or available memory space (e.g., remaining space within a memory device of the system) for processing the request. By doing so, the data generation platform 102 can evaluate the effect of generating an output based on the prompt using the specified model (e.g., LLM) with respect to system requirements or constraints.

In some implementations, the data generation platform 102 (e.g., through performance engine 118) can determine the threshold metric value to include the allowance value. For example, the performance engine 118 determines that the performance metric corresponds to a cost metric. The performance engine 118 can determine a maximum cost value associated with output generation associated with the system. The performance engine 118 can determine, based on the system state, a sum of cost metric values for previous output generation requests associated with the system. The performance engine 118 can determine, based on the maximum cost value and the sum, an allowance value corresponding to the threshold metric value. The performance engine 118 can determine the threshold metric value comprising the allowance value. As an illustrative example, the performance engine 118 determines a remaining budget associated with LLM model operations. By doing so, the performance engine 118 can mitigate cost overruns associated with output text generation, thereby improving the efficiency of the data generation platform 102.

In some implementations, the data generation platform 102 (e.g., through the performance engine 118) can determine the threshold metric value based on a user identifier and corresponding group associated with the output generation request. For example, the data generation platform 102 determines, based on the output generation request, a user identifier associated with a user of the user device. The performance engine 118 can determine, using the user identifier, a first group of users, wherein the first group comprises the use. The performance engine 118 can determine the allowance value associated with the first group of users. As an illustrative example, the performance engine 118 determines an allowance value (e.g., a budget) that is specific to a group of users associated with the user identifier (e.g., a username) of the output generation request. As such, the data generation platform 102 enables tracking of resources assigned or allocated to particular groups of users (e.g., teams), thereby improving the flexibility of allocation of system resources.

In some implementations, the data generation platform 102 (e.g., through the performance engine 118) can determine the threshold metric value based on a usage value for a computational resource. For example, the data generation platform 102 determines that the performance metric corresponds to a usage metric for a computational resource. The performance engine 118 can determine an estimated usage value for the computational resource based on the indication of an estimated computational resource usage by the first model (e.g., LLM) when processing the input (e.g., prompt) with the first model. The performance engine 118 can determine a maximum usage value for the computational resource. The performance engine 118 can determine, based on the system state, a current resource usage value for the computational resource. The performance engine 118 can determine, based on the maximum usage value and the current resource usage value, an allowance value corresponding to the threshold metric value. The performance engine 118 can determine the threshold metric value comprising the allowance value. As an illustrative example, the performance engine 118 can determine a threshold metric value based on a remaining available set of resources that are idle (e.g., processors that are not being used or free memory). As such, the data generation platform 102 enables dynamic evaluation of the state of the system for determination of whether sufficient resources are available for processing the output.

At act 910, the process 900 can determine an estimated performance metric value associated with processing the output generation request. For example, the process 900 determines a first estimated performance metric value for the determined performance metric based on an indication of an estimated resource usage by the first model when processing the input included in the output generation request. As an illustrative example, the data generation platform 102 determines a prediction for resource usage for generating an output using the indicated model (e.g., an LLM associated with the determined performance metric). The data generation platform 102 (e.g., through the performance engine 118) can determine a number of input tokens within the input or prompt and predict a cost and/or a memory usage associated with processing the prompt using the selected model. By doing so, the data generation platform 102 can evaluate the effects of processing the input on system resources for evaluation of the suitability of the model for generating the requested output.

In some implementations, the data generation platform 102 generates a composite performance metric value based on more than one performance metric. For example, the performance engine 118 determines that the performance metric includes a composite metric associated with a plurality of system metrics. The performance engine 118 can determine, based on the system state, a threshold composite metric value. The performance engine 118 can determine a plurality of estimated metric values corresponding to the plurality of system metrics. Each estimated metric value of the plurality of estimated metric values can indicate a respective estimated resource usage associated with processing the output generation request with the first model. The performance engine 118 can determine, using the plurality of estimated metric values, a composite metric value associated with processing the output generation request with the first model. The performance engine 118 can determine the first estimated performance metric value comprising the composite metric value. As an illustrative example, the data generation platform 102 can generate a geometric mean of estimated values associated with various performance metrics (e.g., estimated memory usage, CPU utilization, and/or cost) and determine an associated metric. In some implementations, the data generation platform 102 can generate a weighted geometric mean based on weightings assigned to respective values of the performance metric. By doing so, the data generation platform 102 enables flexible, targeted evaluation of system behavior associated with generating outputs using LLMs.

In some implementations, the data generation platform 102 generates a performance metric value corresponding to a number of input or output tokens. For example, the first estimated performance metric value corresponds to a number of input or output tokens, and wherein the threshold metric value corresponds to a maximum number of tokens. As an illustrative example, the data generation platform 102 determines a number of input tokens (e.g., words or characters) associated with the input or prompt. Additionally or alternatively, the data generation platform 102 determines (e.g., predicts or estimates) a number of output tokens associated with the output in response to the prompt. For example, the data generation platform 102 can estimate a number of output tokens by identifying instructions or words associated with prompt length within the prompt (e.g., an instruction to keep the generated output within a particular limit). By doing so, the data generation platform 102 can compare the number of tokens associated with processing the prompt with an associated threshold number of tokens to determine whether the selected model is suitable for the generation task. As such, the data generation platform 102 can limit wordy or excessive output generation requests, thereby conserving system resources.

In some implementations, the data generation platform 102 generates the estimated performance metric value based on providing the prompt to an evaluation model. For example, the data generation platform 102 provides the input (e.g., the prompt) and an indication of the first model (e.g., LLM) to a performance metric evaluation model to generate the first estimated performance metric value. To illustrate, the data generation platform 102 can provide the input to a machine learning model (e.g., an artificial neural network) to generate an estimate of resources used (e.g., an estimated memory usage or cost) based on historical data associated with output generation. By doing so, the data generation platform 102 improves the accuracy of estimated performance metric value determination, thereby mitigating overuse of system resources.

In some implementations, the data generation platform 102 trains the evaluation model based on previous inputs (e.g., prompts) and associated performance metric values. For example, the data generation platform 102 obtains, from a first database, a plurality of training prompts and respective performance metric values associated with providing respective training prompts to the first LLM. The data generation platform 102 can provide the plurality of training prompts and respective performance metric values to the performance metric evaluation model to train the performance metric evaluation model to generate estimated performance metric values based on prompts. For example, the data generation platform 102 can retrieve previous prompts submitted by users, as well as previous system states when the prompts are submitted to the associated model (e.g., LLM). Based on these previous prompts and system states, the data generation platform 102 can train the performance metric evaluation model to generate estimated performance metrics based on inputs.

At act 912, the process 900 can compare the first estimated performance metric value with the threshold metric value. As an illustrative example, the data generation platform 102 can determine whether the first estimated performance metric value is greater than, equal to, and/or less than the threshold metric value. At act 914, the process 900 can determine whether the first estimated performance metric value satisfies the threshold metric value. (e.g., by determining that the estimated resource usage value is less than or equal to a threshold metric value). For example, the data generation platform 102 can determine whether an estimated cost value associated with processing the prompt using the first model is less than or equal to an allowance value (e.g., a remaining balance within a budget). By doing so, the data generation platform 102 can ensure that the prompt is processed when suitable system resources are available.

At act 916, the process 900 can provide the input (e.g., prompt) to the first model in response to determining that the first estimated performance metric value satisfies the threshold metric value. For example, in response to determining that the first estimated performance metric value satisfies the threshold metric value, the process 900 provides the prompt to the first model to generate a first output by processing the input (e.g., prompt) included in the output generation request. As an illustrative example, the data generation platform 102 can transmit the prompt (e.g., through the communication engine 112 and/or via an associated API) to the first LLM for generation of an associated output. To illustrate, the data generation platform 102 can generate a vector representation of the prompt (e.g., through word2vec or another suitable algorithm) and generate a vector representation of the output via the first LLM. By doing so, the data generation platform 102 can process the user's output generation request with available system resources (e.g., monetary resources or computational resources).

At act 918, the process 900 can generate the output for display on a device associated with the user. For example, the process 900 transmits the first output to a computing system enabling access to the first output by the user device. As an illustrative example, the data generation platform 102 (e.g., through the communication engine 112) can transmit the output from the first LLM to a computing system (e.g., a server) from which the user can access the generated output (e.g., through an API call and/or via a user interface). By doing so, the data generation platform 102 enables generation of outputs (e.g., natural language outputs) using models specified by the user when system resources are available to process associated prompts.

At act 920, the process 900 can determine a second estimated performance metric value associated with a second model (e.g., LLM) in response to determining that the first estimated performance metric value does not satisfy the threshold metric value. For example, in response to determining that the first estimated performance metric value does not satisfy the threshold metric value, the process 900 determines a second estimated performance metric value for the determined performance metric based on an indication of an estimated resource usage by a second model of the plurality of models when processing the prompt included in the output generation request. As an illustrative example, the data generation platform 102 can determine a second estimate for a cost associated with processing the output with the second model and determine whether this cost estimate is consistent with the threshold cost value (e.g., determine whether the cost is less than the budget available to the user for the output generation request).

At act 922, the process 900 can compare the second estimated performance metric value with the threshold metric value. For example, at act 924, the process 900 can determine whether the second estimated performance metric value satisfies the threshold metric value. As an illustrative example, the data generation platform 102 can determine whether the cost metric value associated with processing the input (e.g., prompt) with the second model is greater than, less than, and/or equal to the threshold metric value (e.g., associated with an allowance or budget). By doing so, the data generation platform 102 can ensure that sufficient system resources are available for processing the prompt using the second model, thereby enabling redirection of output generation requests to an appropriate model when the selected model is unsuitable due to insufficient resource availability.

At act 926, the process 900 can generate a second output by providing the prompt to the second model in response to determining that the second estimated performance metric value satisfies the threshold metric value. For example, the process 900 provides the prompt to the second model to generate a second output by processing the input (e.g., prompt) included in the output generation request. As an illustrative example, the data generation platform 102 (e.g., through the communication engine 112) can generate vector representations of the prompt and transmit these (e.g., via an API call) to a device associated with the second model for generation of the associated output. By doing so, the data generation platform 102 enables processing of the output generation request using a model (e.g., the second LLM) that satisfies system resource limitations or constraints, thereby improving the resilience and efficiency of the data generation platform 102.

In some implementations, the process 900 can determine the second model based on a selection of the model by the user. For example, in response to determining that the first estimated performance metric value does not satisfy the threshold metric value, the data generation platform 102 transmits a model (e.g., LLM) selection request to the user device. In response to transmitting the model selection request, the data generation platform 102 obtains, from the user device, a selection of the second model. The data generation platform 102 can provide the input (e.g., prompt) to the second model associated with the selection. As an illustrative example, the data generation platform 102 can generate a message for the user requesting selection of another LLM for generation of an output in response to the prompt. In response to the message, the data generation platform 102 can receive instructions from the user (e.g., via a command or function) for redirection of the prompt to another suitable model that satisfies performance requirements for the system.

In some implementations, the process 900 can determine the second model based on a selection of the model on a GUI (e.g., from a list of models with performance metrics that satisfy the performance requirements). For example, the data generation platform 102, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the data generation platform 102 can receive a user instruction comprising an indication of the second model. In response to receiving the user instruction, the data generation platform 102 can provide the prompt to the second model. To illustrate, the data generation platform 102 can generate indications of one or more recommended LLMs with estimated performance metric values (e.g., estimated cost values) that are compatible with the associated threshold performance metric (e.g., a threshold cost metric). By doing so, the data generation platform 102 can present options for LLMs (e.g., that satisfy system performance constraints) for processing the user's prompt, conferring the user with increased control over output generation.

At act 928, the process 900 can generate the output for display on a device associated with the user. For example, the process 900 transmits the second output to the computing system enabling access to the second output by the user device. As an illustrative example, the data generation platform 102 (e.g., through communication engine 112) transmits the second output to a computing system that enables access to the output by the user (e.g., through an associated API or GUI).

At act 930, the process 900 can transmit an error message to the computing system in response to determining that the second estimated performance metric value does not satisfy the threshold metric value. As an illustrative example, the data generation platform 102 (e.g., through the communication engine 112) can generate a message that indicates that the input (e.g., prompt) is unsuitable for provision the second model due to insufficient resources. Additionally or alternatively, the data generation platform 102 can determine a third model (e.g., LLM) with satisfactory performance characteristics (e.g., with a third estimated performance metric value that satisfies the threshold metric value). By doing so, the data generation platform 102 enables generation of an output based on the prompt via an LLM such that system resources are conserved or controlled.

In some implementations, the process 900 generates a recommendation for an LLM by providing the output generation request (e.g., the associated prompt) to a selection model. For example, in response to determining that the first estimated performance metric value does not satisfy the threshold metric value, the data generation platform 102 generates, for display on a user interface of the user device, a request for user instructions. The request for user instructions can include a recommendation for processing the output generation request with the second model of the plurality of models. In response to generating the request for user instructions, the data generation platform 102 can receive a user instruction comprising an indication of the second model. In response to receiving the user instruction, the data generation platform 102 can provide the input (e.g., prompt) to the second model. As an illustrative example, the data generation platform 102 can evaluate the prompt for selection of a model that is compatible with resource requirements and/or a task associated with the output generation request. For example, the data generation platform 102 can determine an attribute associated with the prompt (e.g., that the prompt is requesting the generation of a code sample) and reroute the prompt to a model that is configured to generate software-related outputs. By doing so, the data generation platform 102 can recommend models that are well-suited to the user's requested task, thereby improving the utility of the disclosed data generation platform.

Dynamic Output Validation for the Data Generation Platform

Figure 10:
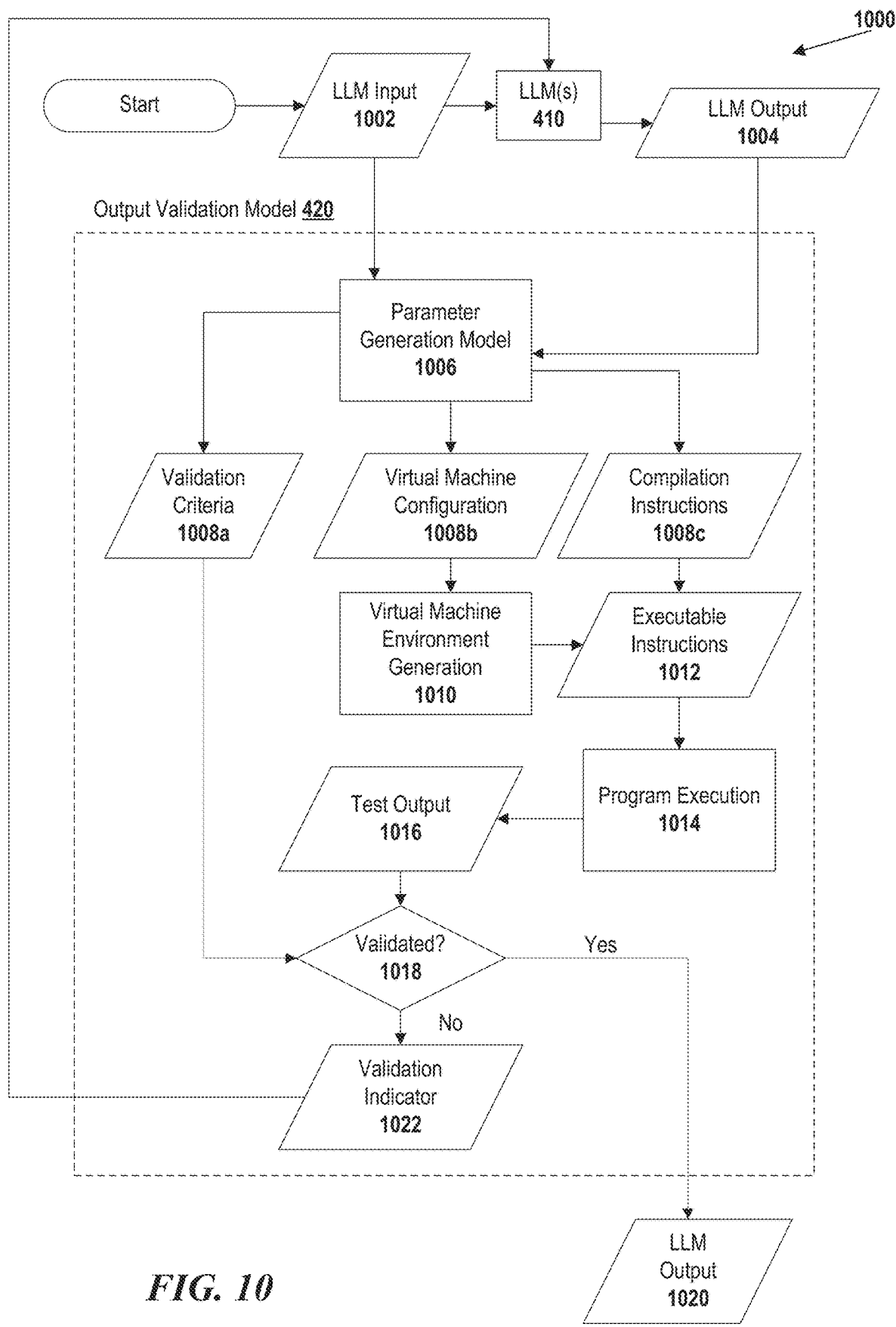
FIG. 10 shows a schematic illustrating a process for validating model outputs in an isolated environment, in accordance with some implementations of the present technology.

FIG. 10 shows a schematic illustrating a process 1000 for validating model outputs in an isolated environment, in accordance with some implementations of the present technology. The process 1000 enables the data generation platform 102 to evaluate and/or validate outputs from one or more machine learning models associated with the platform. For example, the data generation platform 102 can evaluate the safety, accuracy, and/or effects of code samples generated by an LLM in response to a user's prompt.

For example, the data generation platform 102 can receive (e.g., through the communication engine 112) an input (e.g., a prompt for an LLM, such as the LLM input 1002) for generation of software-related information by an associated machine learning model. For example, the input includes a prompt for generation of a code sample using the LLM(s) 410 of FIG. 4. In some implementations, the input includes suitable data, including an image, video, text string, or audio recording (e.g., a voice recording). By providing the prompt (or other suitable input) to a model (e.g., one or more of LLM(s) 410, or another suitable machine learning model), the generative model engine 120 can generate an associated output, such as LLM output 1004 shown in FIG. 10, in response to the user's output generation request.

The output from a machine learning model can include a code sample. In some implementations, a code sample includes software-related information, such as character strings indicating code snippets in one or more specified programming languages. The code sample can be embedded within the model output including other text (e.g., comments, explanations, or other such information). For example, a user associated with the output generation request can request generation of code samples for use in a particular application and/or for deployment on a specified system. To illustrate, the code sample generated by a model of the data generation platform 102 can include a portion of code in a particular language that adds a functionality to an existing application (e.g., for modification of the existing application's source code to include the generated code). The code sample can include one or more function definitions, variable definitions, algorithms, processes, or other suitable information. Additionally or alternatively, the code sample includes binary/executable files and/or other software-related information or data. By generating code sample, the data generation platform 102 enables improvements to software development efficiency by reducing the need for manual writing of code. For example, the data generation platform 102 generates application code, system-level code, pseudocode, coding instructions, and/or guidance for a model (e.g., an LLM) to generate, enhance, or modify existing code.

The output validation model 420, as shown in FIG. 4, can validate the output generated by one or more machine learning models (e.g., the LLM output 1004). For example, the output validation model 420 receives the LLM output 1004 and the associated input (e.g., the LLM input 1002) and provides such data to a parameter generation model 1006 for generation of parameters associated with output validation. Such parameters can include validation criteria 1208a, a virtual machine configuration 1208b, and/or compilation instructions 1208c.

A parameter generation model can include a model configured to generate parameters (e.g., for a validation test). The parameter generation model 1006 can include a machine learning model (e.g., as described previously) configured to receive an input (e.g., the LLM input 1002 and/or other information associated with the output generation request, such as a user identifier), and/or a model output (e.g., the LLM output 1004 and/or other information generated by machine learning models). For example, the parameter generation model 1006 receives a representation of the user's request to generate code associated with deployment of a software application, as well as the code sample generated by an LLM in response to the user's request. Based on such information, the data generation platform 102 can generate validation test parameters that enable validation of the generated code sample (e.g., within an isolated environment corresponding to a virtual machine). The validation test parameters can include one or more of validation criteria 1208a, a virtual machine configuration 1208b, and/or compilation instructions 1208c.

The validation test parameters can include a virtual machine configuration. FIG. 11 shows a data structure 1100 depicting a virtual machine configuration (e.g., the virtual machine configuration 1208b), in accordance with some implementations of the present technology. The virtual machine configuration can include a characterization of an isolated testing environment for compiling, executing, and/or evaluating generated code samples. For example, the parameter generation model 1006 can generate a virtual machine configuration, including an indication of a hardware configuration 1110, a software configuration 1130, and/or a communication configuration 1150 for the testing environment (e.g., a virtual machine environment).

The hardware configuration 1110 can include a characterization of hardware components (e.g., as associated with a virtual machine and/or a run-time environment). For example, a hardware configuration includes an indication of a system architecture, such as a CPU architecture (e.g., x86 and/or ARM) or a GPU architecture (e.g., Single Instruction Single Data (SISD), Single Instruction Multiple Data (SIMD), Multiple Instruction Single Data (MISD), and/or other suitable architectures), an indication of a storage type (e.g., an SSD and/or an HDD), an indication of a storage space (e.g., a size associated with the storage in bytes), and/or an indication of a memory type and/or space (e.g., associated with run-time or random-access memory). In some implementations, the hardware configuration includes the specification of peripherals and/or other devices associated with a computing device. The parameter generation model can generate the hardware configuration depending on the LLM input 1002 and/or the LLM output 1004 (e.g., the user's prompt and/or the generated code sample) based on a determination of hardware requirements associated with execution of the associated application. For example, the parameter generation model 1006 can determine that the code sample includes a request to transmit information to a physical display and can generate the hardware configuration to include an indication of a suitable display peripheral. By generating an indication of a hardware configuration associated with a validation test, the data generation platform 102 enables the specification of properties of a simulated computing device for testing generated code, thereby improving the accuracy and sensitivity of code validation.

The software configuration 1130 can include a characterization of software components (e.g., applications, operating systems, and/or other such components) associated with a virtual machine and/or run-time environment. For example, as shown in FIG. 11, the software configuration 1130 includes an indication of an operating system and/or version, and definition of environment variables (e.g., including a characterization of a home directory path, a display identifier, and/or a system language/locale). In some implementations, the software configuration 1130 includes an indication of libraries to be linked to the compiled executable instructions and/or other dependencies, such as other applications. The parameter generation model can generate the software configuration depending on the LLM input 1002 and/or the LLM output 1004 (e.g., the user's prompt and/or the generated code sample) based on a determination of software requirements associated with execution of the associated application. For example, the parameter generation model 1006 can determine that the code sample includes an indication of a particular software library and can generate the software configuration to include the software library. By specifying a software configuration for the validation test, the data generation platform 102 enables testing of generated code samples in an environment that includes any associated requirements for execution of the associated software application.

The communication configuration 1150 can include a characterization of communication links. For example, the communication configuration 1150 includes information relating to communication interfaces, peripherals, associated protocols, port configurations, data transmission rates, and/or security settings. To illustrate, the communication configuration 1150, as shown in FIG. 11, can include information relating to a standard associated with communication interfaces (e.g., wired or wireless network interfaces and/or interfaces with peripheral devices, such as computer mice, keyboards, and/or displays). The communication configuration 1150 can include an indication of a wireless network type and/or associated security standards, such as encryption standards. Additionally or alternatively, the communication configuration 1150 includes an indication of ports available for transmission of data (e.g., including information relating to associated communication protocols, including Hypertext Transfer Protocol (HTTP), Transmission Control Protocol/Internet Protocol (TCP/IP), and/or File Transfer Protocol (FTP) information). For example, the parameter generation model 1006 can determine that the code sample includes a network request (e.g., to download information via HTTP), and can generate the communication configuration to include a mechanism for accessing the internet. By generating information relating to communication configurations associated with a testing environment for generated code samples, the data generation platform 102 can accurately simulate execution of the associated application.

The data generation platform 102, at the operation 1010 shown in FIG. 10, can generate a virtual machine environment that is consistent with the generated virtual machine configuration 1208b. A virtual machine environment can include a subsystem associated with an environment (e.g., a virtual environment) in which computer programs can run, such as a run-time environment. The virtual machine environment can reside on one or more devices (e.g., in a cloud architecture) and can include containerized and/or non-containerized applications. For example, the environment can specify, define, and/or characterize memory management, environment variables, mechanisms for passing parameters between procedures, interfaces with an operating system, and/or other suitable conditions for computer program execution. For example, the virtual machine environment includes a virtual machine (e.g., an emulation or virtualization of a computer system) based on a particular computer architecture (e.g., as defined by the generated software and/or hardware configurations and/or associated communication configuration).

In some implementations, the parameter generation model 1006 can generate validation test parameters can include compilation instructions (e.g., associated with the code sample). The compilation instructions 1208c can include information, commands, and/or other suitable data associated with code compilation. For example, compilation instructions 1208c include information relating to how to generate an executable program based on a given code sample. In some implementations, the compilation instructions include an indication of a scripting language (e.g., a computer programming language) associated with the code sample. By generating such information, the parameter generation model 1006 provides information to aid in generation of an executable program (e.g., an executable binary and/or instructions) based on human-readable code. For example, the data generation platform 102 can retrieve, from a database of compilers, a compilation routine (e.g., a compiler) associated with a particular scripting language. In some implementations, the compilation instructions 1208c can include an identifier and/or address associated with a compiler for the given code sample (e.g., as associated with the corresponding scripting language). Furthermore, the compilation instructions 1208c can include flags, markers, and/or other customizations relating to the associated virtual machine configuration (e.g., as described below). For example, the compilation instructions 1208c include indications of compiler flags consistent with the virtual machine configuration generated by the parameter generation model 1006.

Additionally or alternatively, the compilation instructions 1208c includes an indication of a source code for the suitable application for which the user requests modification. For example, based on the prompt provided to the LLM by the user (e.g., LLM input 1002), the data generation platform 102 determines a target application and/or associated source code associated with the output generation request. Accordingly, the parameter generation model can generate an indication of how to modify the source code using the generated code sample, as well as instructions to compile the modified source code. As such, by generating compilation instructions, the data generation platform 102 enables flexible, modular modification and/or deployment of applications based on model-generated code samples.

Based on the compilation instructions and the code sample, the data generation platform 102 can generate an executable program within the configured virtual machine environment. For example, the executable program (e.g., the executable instructions 1012 for a software routine) includes a binary file and/or machine-readable instructions enabling execution of a given application or software routine. The data generation platform 102 can generate the executable program within the generated virtual machine environment (e.g., associated with a computing device). To illustrate, the data generation platform 102 can retrieve an address associated with a compilation routine (e.g., via a compiler database associated with the virtual machine environment). For example, the compiler database can include an index of compiler addresses associated with corresponding programming languages. The data generation platform 102 can provide the code sample and/or associated source code to a program associated with the compilation routine to generate the executable instructions (e.g., a binary file), thereby program execution at operation 1014 of FIG. 10. In some implementations, the data generation platform 102 can execute the program associated with code (e.g., a code sample or associated source code for an application) without compiling the code, as in the case of an interpreted scripting language. For example, the compilation instructions can indicate an interpreter address for execution of the code associated with the scripting language.

Process for Validating Model Outputs in a Virtual Environment

Figure 12:
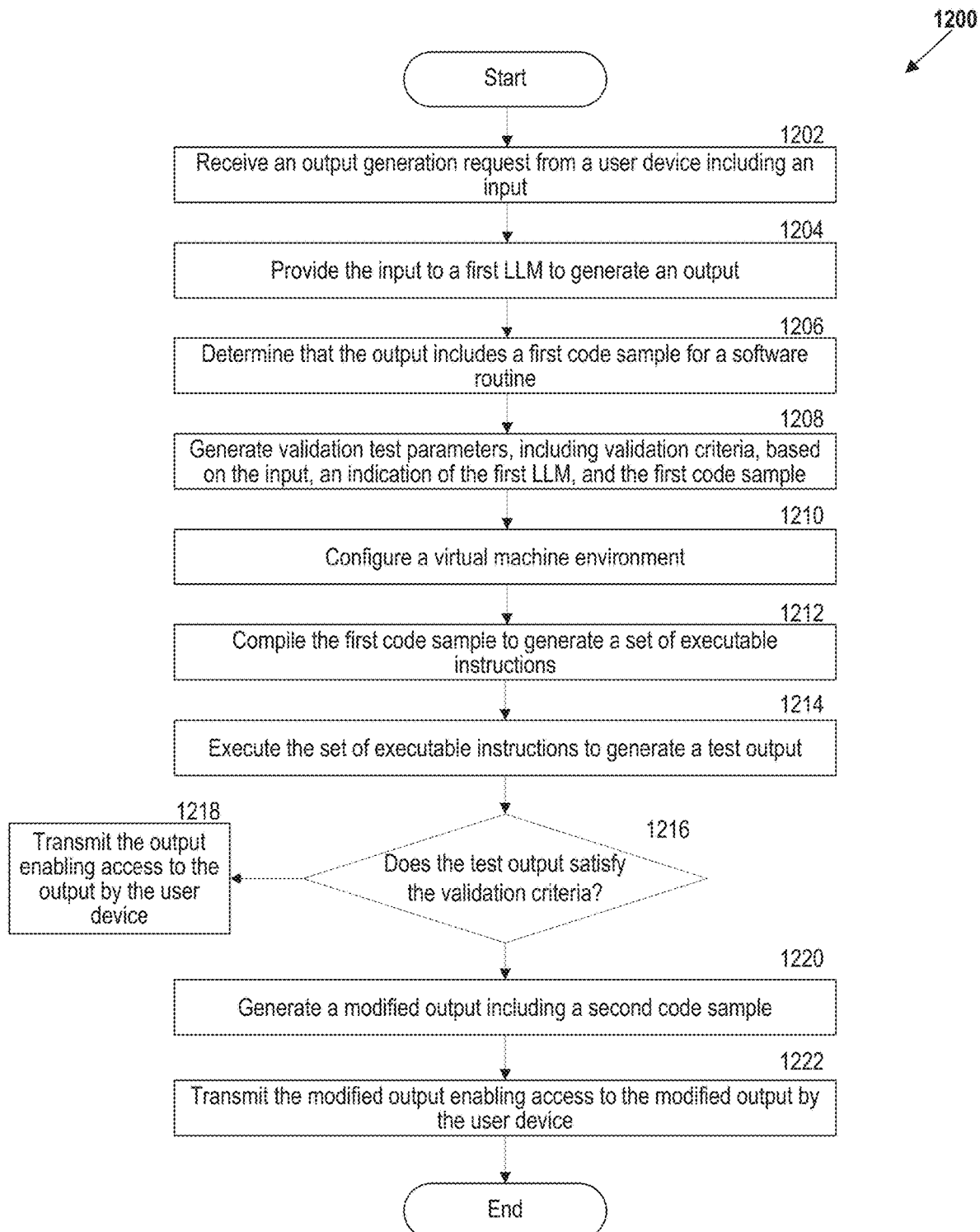
FIG. 12 shows a flow diagram illustrating a process for dynamic evaluation of machine model outputs in an isolated environment, in accordance with some implementations of the present technology.

FIG. 12 shows a flow diagram illustrating a process 1200 for dynamic evaluation of machine model outputs in an isolated environment, in accordance with some implementations of the present technology. For example, the process 1200 enables evaluation of software-related code samples (e.g., code snippets) generated by LLMs for security breaches, intended system behavior, or software bugs/errors based on input-dependent validation tests within an isolated environment.

At act 1202, process 1200 can receive an output generation request that includes an input (e.g., a prompt for generation of text-based output). For example, the data generation platform 102 receives, from a user device, an output generation request including an input for generation of an output using a first large-language model (LLM). As an illustrative example, the data generation platform 102 can receive a text-based prompt indicating generation of a code snippet with a specified functionality and in a particular programming language (e.g., including a function for performing a particular calculation). As such, the data generation platform 102 enables the generation of software-related information, including textual code, according to user specifications.

At act 1204, process 1200 can provide the output to the requested model for generation of an output (e.g., a text-based output). For example, the data generation platform 102 provides the input to the first model to generate the output. As an illustrative example, the data generation platform 102 can provide the user prompt to an LLM that is configured to generate software-related code samples (e.g., one or more portions of source code) in response to user inputs. In some implementations, the output includes portions that are software code and other portions that are descriptions, comments, or other non-code data. Thus, the data generation platform 102 can obtain a model output that includes output (e.g., including a code sample) in response to the output generation request.

At act 1206, process 1200 can determine that the output includes software-related data, such as code. For example, the data generation platform 102 determines that the output includes a first code sample for a software routine. As an illustrative example, the data generation platform 102 can identify one or more portions of output generated from an LLM that correspond to code or other software-related information. For example, the data generation platform 102 extracts data from the LLM that corresponds to code. By doing so, the data generation platform 102 can further evaluate, test, and/or validate the functioning, security, and privacy associated with the execution of the code, as described below.

At act 1208, process 1200 can generate validation test parameters that characterize a test for validating the generated code sample. For example, in response to determining that the output includes the first code sample, the data generation platform 102 provides the input, an indication of the first model, and the first code sample to a parameter generation model to generate validation test parameters. The validation test parameters can include compilation instructions, a virtual machine configuration, and validation criteria. As an illustrative example, the data generation platform 102 can generate test parameters that characterize the nature, strictness, and/or criteria associated with testing the generated code samples for security, privacy and/or errors. For example, the data generation platform 102 determines the nature of the isolated environment (e.g., the virtual machine) in which to generate or compile an executable program associated with the code sample, based on the nature of the code sample and/or the associated output generation request. Additionally or alternatively, the data generation platform 102 identifies a procedure for compiling the code sample (e.g., by updating associated source code and executing a compilation routine). As such, the data generation platform 102 can generate flexible output testing parameters in a prompt-specific and/or application-specific manner.

At act 1210, process 1200 can configure a virtual machine environment according to the generated virtual machine configuration. For example, the data generation platform 102 configures, based on the virtual machine configuration, a virtual machine environment. As an illustrative example, the data generation platform 102 can identify and/or generate a virtual machine with an environment that includes parameters and/or properties as defined within the virtual machine configuration. For example, the data generation platform 102 can generate the virtual machine to simulate any network connections, hardware configurations, or software features as specified within the validation test parameters. By doing so, the data generation platform 102 can prepare an environment (e.g., an isolated environment) in which to test generated code in a safe, flexible manner.

In some implementations, the data generation platform 102 configures the virtual machine environment according to a communication configuration. For example, the data generation platform 102 determines that the virtual machine configuration includes an indication of a communication configuration indicating one or more communication interfaces. The data generation platform 102 can generate the virtual machine environment including a simulation of the one or more communication interfaces. As an illustrative example, the data generation platform 102 configures the virtual machine environment to include simulations of connections, such as WAN, LAN, and/or peripheral connections. By doing so, the data generation platform 102 can test any attempted transmissions associated with the generated code, thereby enabling the mitigation of security breaches or the unintended exposure of private information.

In some implementations, the data generation platform 102 configures the virtual machine environment according to a hardware configuration. For example, the data generation platform 102 determines that the virtual machine configuration includes an indication of a hardware configuration indicating a system architecture. The data generation platform 102 can generate the virtual machine environment including a simulation of the system architecture. As an illustrative example, the data generation platform 102 can simulate a hardware architecture (e.g., including emulation of central processing units (CPUs), graphics processing units (GPUs), and/or other associated hardware devices) within the virtual machine environment, thereby enabling comprehensive testing of system behavior due to the execution of generated code.

At act 1212, process 1200 can compile the first code sample to generate executable instructions for further testing. For example, the data generation platform 102 compiles, within the virtual machine environment and using the compilation instructions, the first code sample to generate a set of executable instructions for the software routine. As an illustrative example, the data generation platform 102 generate an executable version of a software routine associated with the code sample (e.g., an executable binary file) using the compilation instructions associated with the generated validation test parameters. For example, the data generation platform 102, using the compilation instructions, configures the executable binary file to be compatible with the simulated hardware architecture and/or software consistent with the virtual machine configuration. By doing so, the data generation platform 102 can prepare the generated code to be tested within the isolated environment (e.g., the virtual machine).

In some implementations, the data generation platform 102 configures a compilation routine based on identification of an associated scripting language. For example, the data generation platform 102 determines that the compilation instructions include an identifier of a scripting language. The data generation platform 102 can determine, from a compiler database, a compilation routine associated with the scripting language. The data generation platform 102 can configure, based on the virtual machine configuration, the compilation routine for operability within the virtual machine environment. The data generation platform 102 can generate, within the virtual machine environment and using the configured compilation routine, the set of executable instructions for the software routine. As an illustrative example, the data generation platform 102 can identify a programming language associated with the generated code and search for or identify an associated compiler. For example, the data generation platform 102 extracts an address associated with the compiler within a compiler database to determine a compiler (e.g., or an associated compilation routine) that is compatible with the compilation instructions, thereby enabling compilation of the code sample and generation of the associated executable instructions.

At act 1214, process 1200 can execute the executable instructions to generate a test output. For example, the data generation platform 102 executes, within the virtual machine environment, the set of executable instructions for the software routine to generate a test output. As an illustrative example, the data generation platform 102 can run, execute, or process the compiled instructions. In some implementations, the data generation platform 102, via the virtual machine configuration, can log (e.g., monitor) actions or effects of the running software routine. For example, the data generation platform 102 can detect communications associated with the simulated communication interfaces of the virtual machine, and/or determine run-times associated with the program. As such, the data generation platform 102 enables evaluation of the system behavior in relation to the code sample generated by the model in response to the output generation request.

At act 1216, process 1200 can determine whether the test output satisfies the validation criteria. For example, the data generation platform 102 determines a validation indicator specifying whether the test output satisfies the validation criteria. As an illustrative example, the data generation platform 102 can extract one or more criteria associated with the generated validation criteria of the validation test parameters. For example, the data generation platform 102 can extract a criterion specifying that memory usage is to remain within a particular range of values. The data generation platform 102 can monitor the test output (e.g., including readings of memory usage over time) to determine whether the criterion is satisfied throughout the execution of the executable program instructions. By doing so, the data generation platform 102 enables validation of the code generated via the associated models by evaluating the associated system behavior.

In some implementations, the data generation platform 102 validates communications associated with the virtual machine environment for anomalies. For example, the data generation platform 102 determines that the validation criteria includes an anomaly criterion indicating that an anomalous communication is forbidden. The data generation platform 102 can evaluate the test output including communications associated with the one or more communication interfaces. Based on determining that the communications include the anomalous communication, the data generation platform 102 can determine that the test output does not satisfy the validation criteria. The data generation platform 102 can generate the validation indicator including an indication that the test output does not satisfy the validation criteria. As an illustrative example, the data generation platform 102 can determine an attempt to initiate an unexpected connection (e.g., a WAN connection when only a LAN connection is allowed, according to validation criteria). By doing so, the data generation platform 102 can ensure that, following software deployment, sensitive information is not shared with unauthorized devices (e.g., beyond a particular LAN), thereby improving system security.

In some implementations, the data generation platform 102 determines a measure of similarity between the test output and an expected output to determine whether the test output satisfies the validation criteria. For example, the data generation platform 102 determines, based on the validation criteria, an expected test output for the software routine. The data generation platform 102 can generate a first vector representation for the expected test output and a second vector representation for the test output. The data generation platform 102 can generate a similarity metric value including a measure of a similarity metric between the first vector representation and the second vector representation. The data generation platform 102 can determine, based on the output generation request, a threshold value associated with the similarity metric. The data generation platform 102 can comparing the similarity metric value with the threshold value. Based on determining that the similarity metric value satisfies the threshold value, the data generation platform 102 can determine that the test output satisfies the validation criteria. The data generation platform 102 can generate the validation indicator specifying that the test output satisfies the validation criteria. As an illustrative example, the data generation platform 102 can determine an expected output (e.g., an expected log file) based on the validation criteria and/or other associated validation test parameters. To illustrate, the expected output can describe expected or predicted actions taken in response to executing the compiled code sample, such as memory usage, connections, and/or generation of other requested outputs (e.g., data generated by the executable instructions). The data generation platform 102 can compare the expected output with the actual test output to determine a similarity metric value (e.g., by comparing vector representations of the respective outputs). Based on determining the similarity metric value, the data generation platform 102 can determine if the test output differs from the expected output by a threshold value and, as such, can flag or detect unexpected behavior. As such, the data generation platform 102 enables improved anomalous behavior detection for an associated system.

In some implementations, the data generation platform 102 can determine the threshold value based on a user risk level associated with the output generation request. For example, the data generation platform 102 determines a user identifier associated with the output generation request. The data generation platform 102 can determine, based on a user database, a risk level for a user associated with the user identifier. The risk level can indicate a low, medium, or high risk associated with user activity for the user. In response to determining that the risk level indicates the medium or high risk associated with the user activity, the data generation platform 102 can determine a first value for the threshold value. In response to determining that the risk level indicates the low risk associated with the user activity, the data generation platform 102 can determine a second value for the threshold value, wherein the second value is greater than the first value. As an illustrative example, the data generation platform 102 can determine a strictness associated with evaluating the differences between an expected output and the test output on the basis of user credentials and/or a risk level associated with the user associated with the output generation request. For example, a user with less coding experience (e.g., with a number of years of experience fewer than a threshold number) can be assigned a high or medium risk level. Additionally or alternatively, a user with more coding experience (e.g., with a number of years of experience greater than the threshold number) can be assigned a low risk level. By tuning the threshold value associated with the similarity metric according to user credentials and/or user risk, the data generation platform 102 can improve mitigation of security breaches, errors, or bugs in a user-specific, targeted manner, thereby improving the efficiency of output evaluation by focusing system resources on users most likely to commit errors in software development.

In some implementations, the data generation platform 102 can determine whether the test output includes sensitive information (e.g., from the sensitive token database). For example, the data generation platform 102 determines that the validation criteria includes a privacy criterion indicating that sensitive information is forbidden in the test output. Based on determining that the validation criteria includes the privacy criterion, the data generation platform 102 can determine whether the test output includes a sensitive token of a sensitive token database. The data generation platform 102 can generate the validation indicator including an indication of whether the test output includes the sensitive token of the sensitive token database. As an illustrative example, the data generation platform 102 can determine that the test output includes sensitive and/or private information, such as PII, secrets, or other such information, based on determining that a token (e.g., a word, phrase, or sentence) of the test output is included within a sensitive token database. By doing so, the data generation platform 102 can prevent disclosure and/or exposure of sensitive or private information, thereby improving the safety of the system to which the code is to be deployed.

At act 1218, process 1200 can transmit the output from the first model in order to provide access to the output (e.g., the generated code sample) for the user. For example, in response to determining that the test output satisfies the validation criteria, the data generation platform 102 transmits the output to a server system enabling access to the output by the user device. As an illustrative example, the data generation platform 102 can determine that the test output satisfies validation criteria generated by the parameter generation model. For example, the data generation platform 102 determines that the test output indicates that the virtual machine remained within memory usage requirements specified by the validation criteria and did not attempt to communicate with forbidden devices (e.g., through forbidden communication channels). By doing so, the data generation platform 102 can ensure the security of the system prior to providing the generated code sample to the user requesting the code sample, in response to the output generation request.

At act 1220, process 1200 can generate a modified output when the test output does not satisfy the validation criteria. For example, in response to determining that the test output does not satisfy the validation criteria, the data generation platform 102 generates a modified output including a second code sample different from the first code sample. As an illustrative example, the data generation platform 102 can determine that the virtual machine, when executing the executable instructions associated with the code sample, does not satisfy memory usage requirements and/or attempts to communicate via forbidden channels. By doing so, the data generation platform 102 can modify the code to resolve any detected deficiencies in the validation test (e.g., based on an indication of a validation error). By doing so, the data generation platform 102 can resolve any bugs, errors, and/or security issues associated with the code sample generated in response to the output generation request.

In some implementations, the data generation platform 102 can generate the modified output by providing an indication of a validation error (e.g., associated with the validation indicator) to an LLM. For example, the data generation platform 102 determines, based on the validation indicator, an indication of a validation error associated with the test output. The indication of the validation error can include an indication of a criterion of the validation criteria that is not satisfied by the test output. The data generation platform 102 can provide the indication of the validation error, the first code sample, and the input to the first LLM to generate the modified output including the second code sample. As an illustrative example, the data generation platform 102 can generate a summary of any deficiencies associated with the validation test failure (e.g., an indication of particular criteria that was not satisfied by the test output) and provide such information to the LLM, along with the first code sample, to modify the code sample to resolve issues causing the validation test failure. For example, the data generation platform 102 modifies the code sample to prevent communication via a forbidden communication channel and/or to a forbidden communication device. By doing so, the data generation platform 102 can fix generated code in a targeted manner, improving the efficiency of software development.

At act 1222, process 1200 can transmit the modified output in order to provide access to the modified output for the user. For example, the data generation platform 102 transmits the modified output to the server system to enable access to the modified output by the user device. As an illustrative example, the data generation platform 102 can provide the modified output (e.g., including a modified code sample) to the user in response to the output generation request. As such, the data generation platform 102 can provide generated code to a user following validation and resolution of any validation test discrepancies, thereby improving the quality and security of the generated code for use by the user.

In some implementations, the data generation platform 102 can transmit the modified output to the user device in response to validating the modified output. For example, the data generation platform 102 compiles, within the virtual machine environment and using the compilation instructions, the second code sample to generate a second set of executable instructions. The data generation platform 102 can execute, within the virtual machine environment, the second set of executable instructions to generate a second test output. The data generation platform 102 can determine whether the second test output satisfies the validation criteria. In response to determining that the second test output satisfies the validation criteria, the data generation platform 102 can transmit the modified output to the server system to enable access to the modified output by the user device. As an illustrative example, the data generation platform 102 can ensure that the modified output (and/or the associated code) is consistent with the validation criteria prior to transmission to the user, thereby preventing any additional errors or security breaches introduced as a result of the modification.

Mapping Identified Gaps in Controls to Operative Standards

Figure 13:
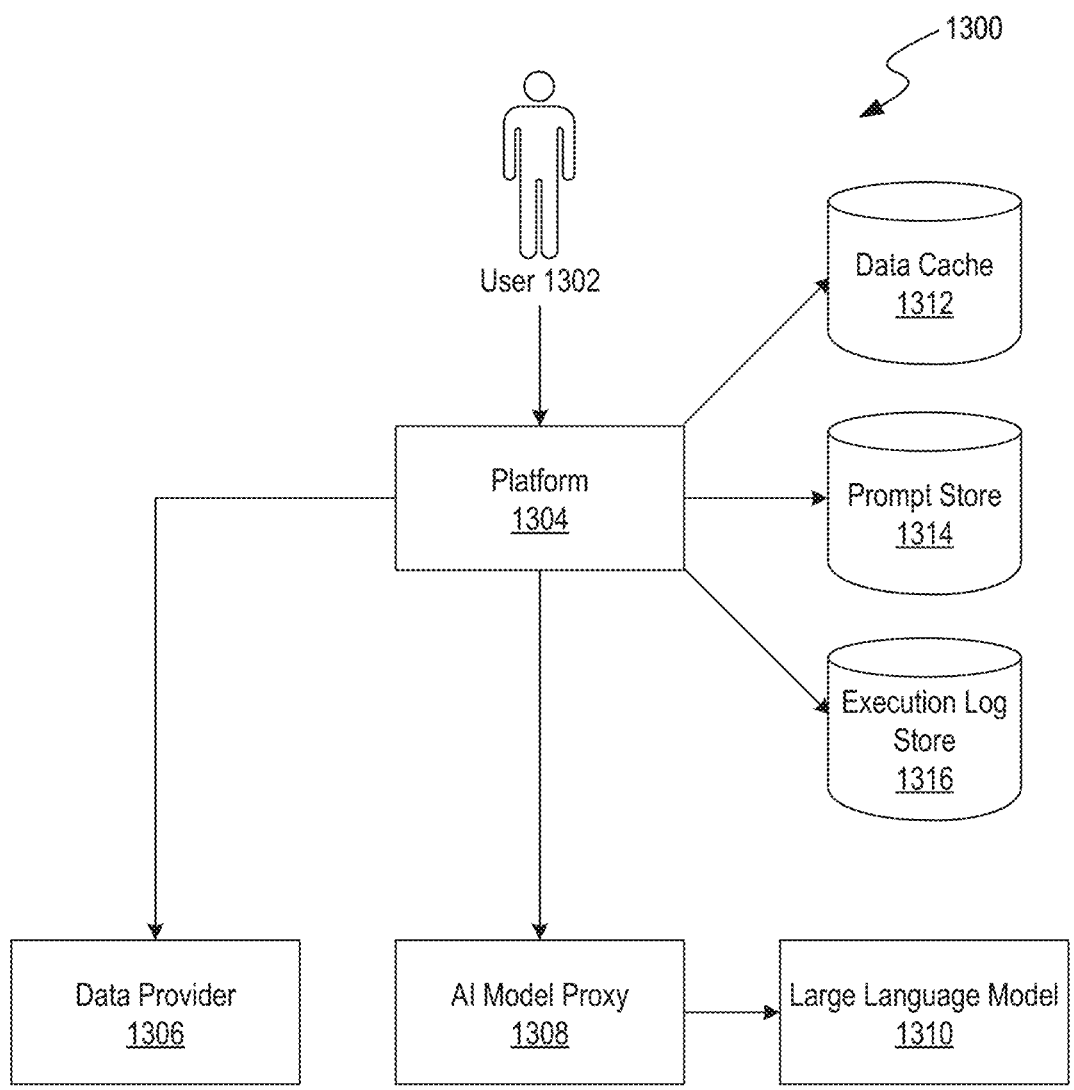
FIG. 13 is an illustrative diagram illustrating an example environment of a platform for automatically managing guideline compliance, in accordance with some implementations of the present technology.

FIG. 13 is an illustrative diagram illustrating an example environment 1300 of a platform for automatically managing guideline compliance, in accordance with some implementations of the present technology. Environment 1300 includes user 1302, platform 1304, data provider 1306, AI model proxy 1308, LLM 1310, data cache 1312, prompt store 1314, and execution store log 1316. Platform 1304 is implemented using components of example devices 200 and computing devices 302 illustrated and described in more detail with reference to FIG. 2 and FIG. 3, respectively. Likewise, implementations of example environment 1300 can include different and/or additional components or can be connected in different ways.

User 1302 interacts with the platform 1304 via, for example, a user interface. Platform 1304 can be the same as or similar to data generation platform 102 with reference to FIG. 1. Users 1302 can input data, configure compliance parameters, and manage guideline compliance performance through an intuitive interface provided by the platform. Examples of the input data are discussed with reference to FIG. 14 and FIG. 16. The platform 1304 can perform a variety of compliance management tasks, such as compliance checks and regulatory analyses. Further tasks performed by the platform 1304 are discussed with reference to FIGS. 1-12 and FIGS. 14-16.

Data provider 1306 supplies the platform 1304 with the data used in the management, which can include regulatory guidelines, compliance requirements, organizational guidelines, and other relevant information. The data supplied by data provider 1306 can be accessed via an application programming interface (API) or database that contains policies, obligations, and/or controls in operative standards. In some implementations, the data supplied by data provider 1306 contains the publications (e.g., regulatory guidelines, compliance requirements, organizational guidelines) themselves. The structured repository of data provider 1306 allows platform 1304 to efficiently retrieve and use the data in different management processes. In some implementations, data provider 1306 includes existing mappings associated with the operative standards. For example, the pre-established mappings can be between the operative standards and gaps (e.g., issues). In another example, the pre-established mappings can be between the operative standards and publications. Using the existing relationships, the platform 1304 can more efficiently map particular identified gaps to the relevant operative standards. For example, if a newly identified gap is similar to or the same as a previously identified gap (e.g., shares similar scenario attributes, metadata tags) within the pre-existing mappings, the platform 1304 can use the pre-existing mapping of the previously identified gap to more easily identify the mapping for the newly identified gap. Examples of scenario attributes and metadata tags of identified gaps are further discussed with reference to FIG. 14 and FIG. 16.

AI model proxy 1308 is an intermediary between the platform and the large language model (LLM) 1310. AI model proxy 1308 facilitates the communication and data exchange between the platform 1304 and the LLM 1310. AI model proxy 1308, in some implementations, operates as a plugin to interconnect the platform 1304 and the LLM 1310. The AI model proxy 1308, in some implementations, includes distinct modules, such as data interception, inspection, or action execution. In some implementations, containerization methods such as Docker are used within the AI model proxy 1308 to ensure uniform deployment across environments and minimize dependencies. LLM 1310 analyzes data input by user 1302 and data obtained from data provider 1306 to identify patterns and generate compliance-related outputs. The AI model proxy 1308, in some implementations, enforces access control policies to safeguard sensitive data and functionalities exposed to the LLM 1310. For example, the AI model proxy 1308 can sanitize the data received from the platform 1304 using encryption standards, token-based authentication, and/or role-based access controls (RBAC) to protect sensitive information. The data received can be encrypted to ensure that all sensitive information is transformed into an unreadable format, accessible only through decryption with the appropriate keys. Token-based authentication can be used by generating a unique token for each user session or transaction. The token acts as a digital identifier by verifying the user's identity and granting access to specific data or functions within the system. Additionally, RBACs can restrict data access based on the user's role within the organization. Each role can be assigned specific permissions to ensure that users only access data relevant to the users' responsibilities.

In some implementations, AI model proxy 1308 employs content analysis to discern between the sensitive and non-sensitive by identifying specific patterns, keywords, or formats indicative of sensitive information. In some implementations, the list of indicators of sensitive information is generated by an internal generative AI model within the platform 1304 (e.g., with a command set that resembles "generate a plurality of examples of PII"). The generative AI model can be trained on a dataset containing examples of sensitive data elements, such as personally identifiable information (PII), financial records, or other confidential information. Once the AI model has been trained, the AI model can generate indicators (e.g., specific patterns, keywords, or formats) of sensitive information based on the model's learned associations. For example, gap data that includes sensitive financial information such as account numbers, transaction details, and personal information of stakeholders can be identified and subsequently removed and/or masked.

Data cache 1312 can store data for a period of time to reduce the time required to access frequently used information. Data cache 1312 ensures that the system can quickly retrieve necessary data without repeatedly querying the data provider 1306, thus improving the overall efficiency of platform 1304. In some implementations, a caching strategy is implemented that includes cache eviction policies, such as least recently used (LRU) or time-based expiration, to ensure that the cache remains up-to-date and responsive while optimizing memory usage. LRU allows the data cache 312 to keep track of which data items have been accessed most recently. When the data cache 312 reaches maximum capacity and needs to evict an item (e.g., data packets) to make room for new data, the data cache 312 will remove the least recently used item. Time-based expiration involves setting a specific time duration for which data items are considered valid in the data cache 312. Once this duration expires, the data item is automatically invalidated and removed from the data cache 312 to preserve space in the data cache 312.

Prompt store 1314 contains predefined prompts that guide the LLM 1310 in processing data and generating outputs. Prompt store 1314 is a repository for pre-existing prompts that are stored in a structured and accessible format (e.g., using distributed databases or NoSQL stores), which allows for efficient retrieval and utilization by the AI model 506. In some implementations, the prompts are preprocessed to remove any irrelevant information, standardize the format, and/or organize the prompts into a structured database schema. In some implementations, prompt store 1314 is a vector store where the prompts are vectorized and stored in a vector space model, and each prompt is mapped to a high-dimensional vector representing the prompt's semantic features and relationships with other prompts. In some implementations, the prompts are stored using graph databases such as Neo4j™ or Amazon Neptune™. Graph databases represent data as nodes and edges, allowing for the modeling of relationships between prompts to demonstrate the interdependencies. In some implementations, the prompts are stored in a distributed file system such as Apache Hadoop™ or Google Cloud Storage™. These systems offer scalable storage for large volumes of data and support parallel processing and distributed computing. Prompts stored in a distributed file system can be accessed and processed by multiple nodes simultaneously, which allows for faster retrieval and analysis by the system. For example, the details of a particular gap, such as relevant metrics, severity level, and/or specific publication references, can be used to structure a prompt for the LLM 1310 by inserting the details into appropriate places in the predefined prompt.

Execution store log 1316 records some or all actions and processes executed by the platform 1304. Execution store log 1316 can serve as an audit trail, providing a history of compliance activities and decisions made by the platform 1304. Each logged entry in execution store log 1315 can include details such as timestamps, user identifiers, specific actions performed, and relevant contextual information. Execution store log 1316, in some implementations, can be accessed via the platform 1304 via an API.

Figure 14:
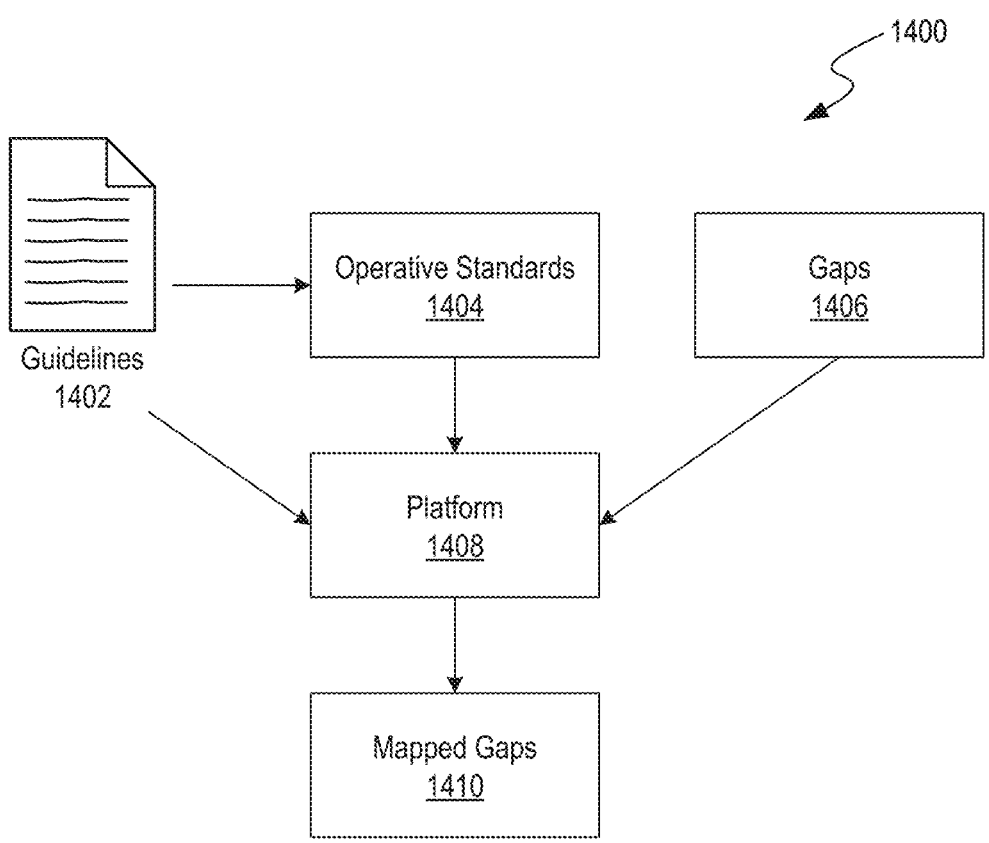
FIG. 14 is an illustrative diagram illustrating an example environment of the platform using guidelines and gaps in controls to generate mapped gaps, in accordance with some implementations of the present technology.

FIG. 14 is an illustrative diagram illustrating an example environment 1400 of the platform using guidelines and gaps in controls to generate mapped gaps, in accordance with some implementations of the present technology. Environment 1400 includes guidelines 1402, operative standards 1404, gaps 1406, platform 1408, and mapped gaps 1410. Platform 1408 is the same as or similar to platform 1304 with reference to FIG. 13. Implementations of example environment 1300 can include different and/or additional components or can be connected in different ways.

Guidelines 1402 can include publications of regulations, standards, and policies that organizations adhere to. Guidelines 1402 serve as the benchmark against which compliance is measured. Guidelines 1402 can include publications such as jurisdictional guidelines and organizational guidelines. Jurisdictional guidelines (e.g., governmental regulations) can include guidelines gathered from authoritative sources such as government websites, legislative bodies, and regulatory agencies. Jurisdictional guidelines can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build to ensure the protection of sensitive user data and compliance with the regulations. Organizational guidelines include internal policies, procedures, and guidelines established by organizations to govern activities within the organization's operations. Organizational guidelines can be developed in alignment with industry standards, legal requirements, best practices, and organizational objectives. For example, organizational guidelines can require AI models to include certain access controls to restrict unauthorized access to the model's APIs or data and/or have a certain level of resilience before deployment.

In some implementations, guidelines 1402 can any one of text, image, audio, video or other computer-ingestible format. For guidelines 1402 that are not text (e.g., image, audio, and/or video), the guidelines 1402 can first be transformed into text. Optical character recognition (OCR) can be used for images containing text, and speech-to-text algorithms can be used for audio inputs. For example, an audio recording detailing financial guidelines can be converted into text using a speech-to-text engine that allows the system to parse and integrate the text output into the existing guidelines 1402. Similarly, a video demonstrating a particular procedure or protocol can be processed to extract textual information (e.g., extracting captions).

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

In some implementations, the guidelines 1402 can be stored in a vector store. The vector store stores the guidelines 1402 in a structured and accessible format (e.g., using distributed databases or NoSQL stores), which allows for efficient retrieval and utilization by the platform 1408. In some implementations, the guidelines 1402 are preprocessed to remove any irrelevant information, standardize the format, and/or organize the guidelines 1402 into a structured database schema. Once the guidelines 1402 are prepared, the guidelines 1402 can be stored in a vector store using distributed databases or NoSQL stores. To store the guidelines 1402 in the vector store, the guidelines 1402 can be encoded into vector representations. The textual data of the guidelines 1402 are transformed into numerical vectors that capture the semantic meaning and relationships between words or phrases in the guidelines 1402. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 1402. For example, the system can assign higher weights to words that are more unique to a specific document and less common across the entire corpus.

In some implementations, the guidelines 1402 are stored using graph databases such as Neo4j™ or Amazon Neptune™. Graph databases represent data as nodes and edges, allowing for the modeling of relationships between guidelines 1402 to demonstrate the interdependencies. In some implementations, the guidelines 1402 are stored in a distributed file system such as Apache Hadoop™ or Google Cloud Storage™ These systems offer scalable storage for large volumes of data and support parallel processing and distributed computing.

The vector store can be stored in a cloud environment hosted by a cloud provider, or a self-hosted environment. In a cloud environment, the vector store has the scalability of cloud services provided by platforms (e.g., AWS™, Azure™). Storing the vector store in a cloud environment entails selecting the cloud service, provisioning resources dynamically through the provider's interface or APIs, and configuring networking components for secure communication. Cloud environments allow the vector store to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices. Conversely, in a self-hosted environment, the vector store is stored on a private web server. Deploying the vector store in a self-hosted environment entails setting up the server with the necessary hardware or virtual machines, installing an operating system, and storing the vector store. In a self-hosted environment, organizations have full control over the vector store, allowing organizations to implement customized financial measures and compliance policies tailored to the organization's specific needs. For example, organizations in industries with strict data privacy and financial regulations, such as finance institutions, can mitigate security risks by storing the vector store in a self-hosted environment.

Operative standards 1404 can be specific obligations derived from the guidelines to comply with the guidelines, and can encompass both specific actionable directives and general principles. In some examples, operative standards 1404 can serve as actionable directives that organizations must adhere to in order to meet the requirements laid out in regulatory guidelines or industry best practices (e.g., guidelines 1402). For example, an operative standard derived from a data protection guideline might mandate the adoption of a specific framework (e.g., GDPR) for handling personal data, outlining procedures for data access, encryption standards, and breach notification protocols. In another example, an operative standard can include prohibiting a certain action to be taken, such as transmitting confidential information to external sources. In further examples, operative standards 1404 encompass the fundamental principles or benchmarks derived from guidelines that guide organizational practices and behaviors towards achieving desired outcomes. For example, in the context of ethical standards within a business, operative standards can include principles such as integrity, transparency, and accountability.

Gaps 1406 are instances where the current controls or processes fall short of meeting the operative standards. Gaps 1406 can be due to the absence of required controls or the inadequacy of existing controls. For example, in the context of data security, a gap may be identified if a company lacks a comprehensive data encryption policy despite regulatory requirements specifying encryption standards for sensitive information. In another example, though an organization may have implemented access controls for sensitive systems, a gap may be identified when the organization fails to regularly review and update user permissions as required by industry best practices, thereby leaving potential vulnerabilities unaddressed.

Gaps 1406 can be managed through a systematic approach that incorporates self-reporting and comprehensive storage of attributes tailored to each scenario associated with the gap 1406. A scenario of a gap 1406 refers to a specific instance or situation where current controls or processes within an organization do not meet established operative standards 1404. Each scenario associated with a gap 1406 represents a distinct use case. For instance, a scenario can include a cybersecurity breach due to inadequate data encryption practices, or can include a compliance issue related to incomplete documentation of financial transactions. Each identified gap 1406 can be documented with scenario attributes (e.g., metadata, tags) such as a descriptive title, severity level assessment (e.g., graded from 1 to 5, where 1 denotes severe and 5 signifies trivial), and/or tags linking the gap 1406 to specific business units or regulatory requirements. The scenario attributes provide a clear understanding of the gap's impact and context. In some implementations, the platform 1408 includes a user interface that allows users to input and edit the scenario attributes for each gap of gaps 1406.

Platform 1408 receives the guidelines, operative standards, and/or identified gaps, and generates mapped gaps 1410. The mapped gaps correlate the identified gaps with the specific operative standards the identified gaps fail to meet. Methods of mapping the identified gaps with the specific operative standards are discussed with further reference to FIG. 16.

Figure 15:
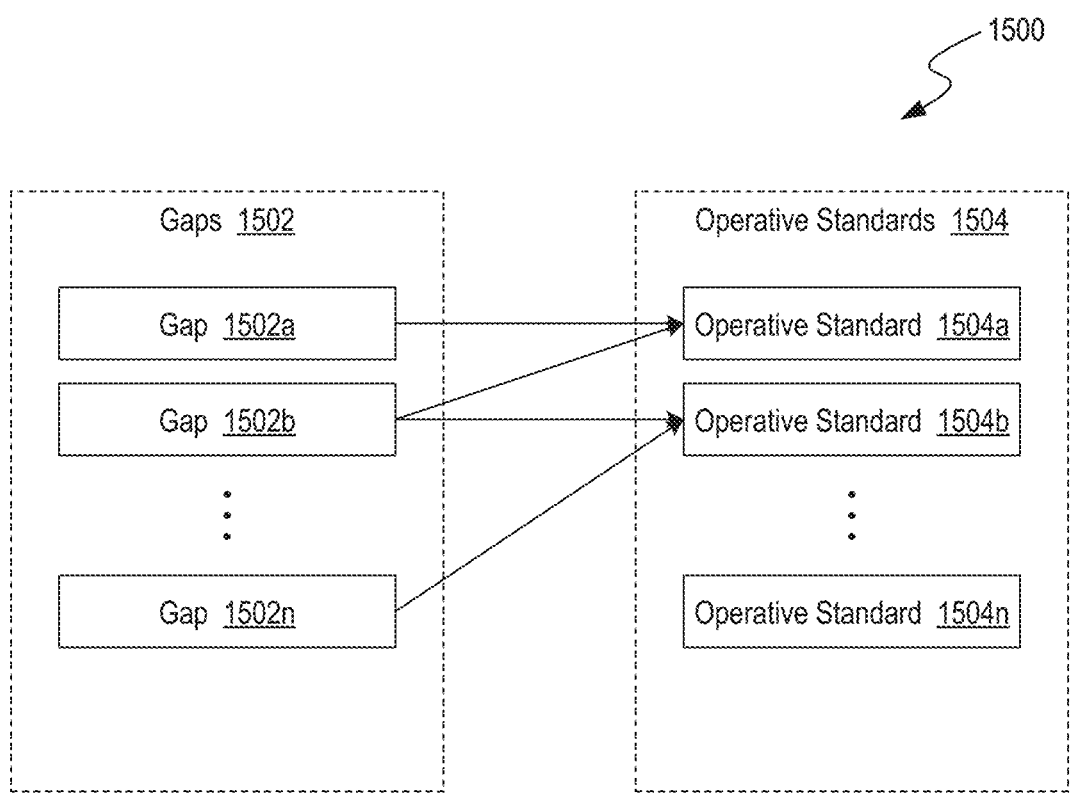
FIG. 15 is an illustrative diagram illustrating an example environment of the platform mapping identified gaps in controls to operative standards, in accordance with some implementations of the present technology.

FIG. 15 is an illustrative diagram illustrating an example environment 1500 of the platform mapping identified gaps in controls to operative standards, in accordance with some implementations of the present technology. Environment 1500 includes gaps 1502a-n and operative standards 1504a-n. Gaps 1502a-n is the same as or similar to gaps 1406 with reference to FIG. 14. Operative standards 1504a-n is the same as or similar to operative standards 1404 with reference to FIG. 14. Implementations of example environment 1500 can include different and/or additional components or can be connected in different ways.

Gaps 1502a-n are mapped to operative standards 1504a-n. For example, a gap including a shortfall in data encryption practices can be mapped to an operative standard specifying encryption protocols mandated by regulatory guidelines. In another example, a gap can be associated with inadequate user access controls and mapped to an operative standard that detail requirements for access management and segregation of duties. Methods of mapping gaps 1502a-n to operative standards 1504a-n are discussed with reference to FIG. 16.

In FIG. 15, gap 1502a is directly mapped to operative standard 1504a. In contrast, gap 1502b is mapped to multiple operative standards 1504a, 1504b. Mapping a single gap 1502b to multiple operative standards 1504a, 1504b ensures that the organization addresses various facets of identified gaps systematically. Furthermore, some operative standards may not have any gaps mapped to them, such as operative standard 1504n. In some implementations, the situation may arise if the organization has already achieved compliance in that specific area or if the standard is not directly applicable to current operational practices. In some implementations, the number of gaps 1502 is different from the number of operative standards 1504.

Figure 16:
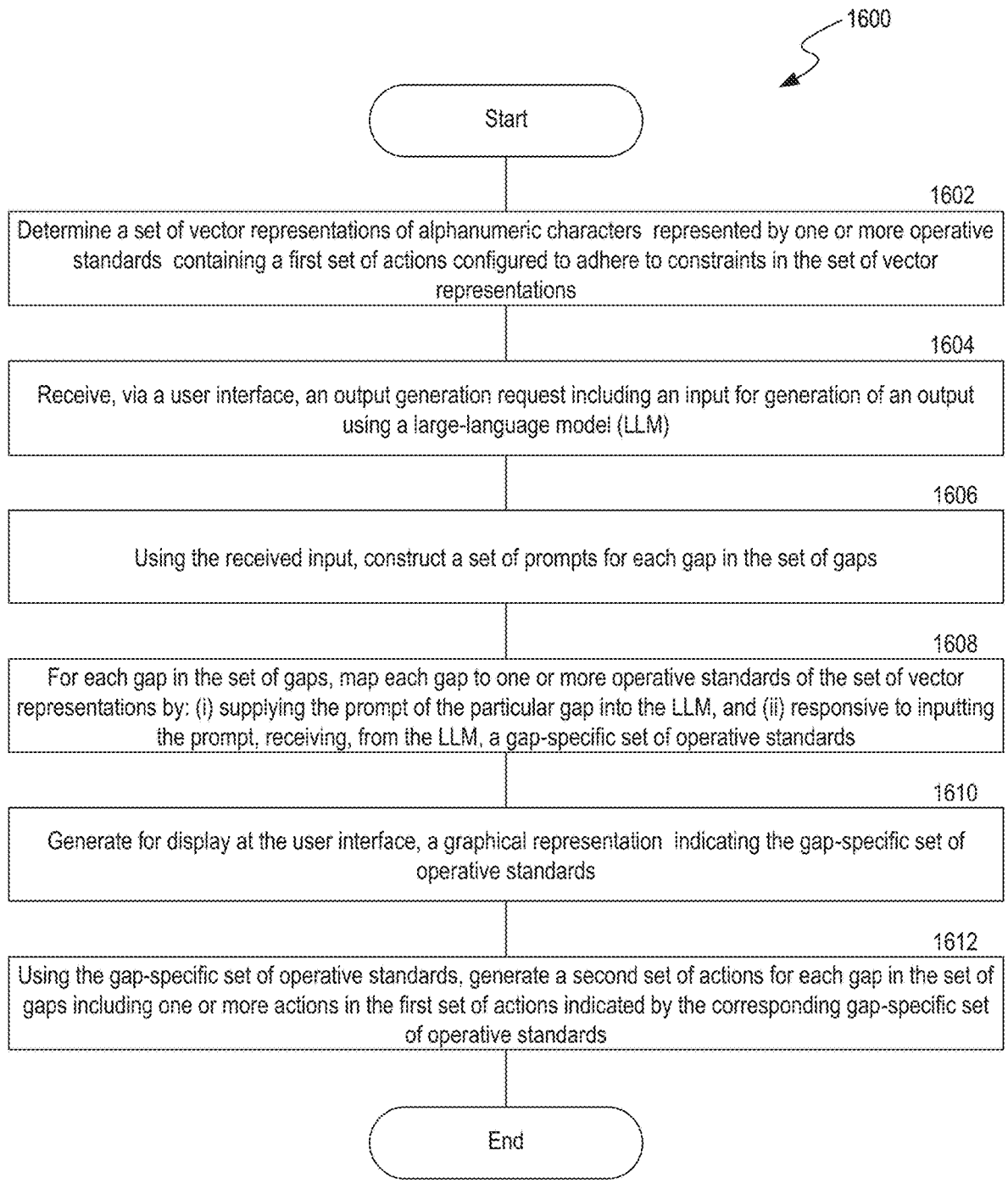
FIG. 16 is a flow diagram illustrating a process of mapping identified gaps in controls to operative standards, in accordance with some implementations of the present technology.

FIG. 16 is a flow diagram illustrating a process 1600 of mapping identified gaps in controls to operative standards, in accordance with some implementations of the present technology. In some implementations, the process 1600 is performed by components of example devices 200 and computing devices 302 illustrated and described in more detail with reference to FIG. 2 and FIG. 3, respectively. Particular entities, for example, LLM 1310, are illustrated and described in more detail with reference to FIG. 13. Likewise, implementations can include different and/or additional steps or can perform the steps in different orders.

In act 1602, the system determines a set of vector representations of alphanumeric characters represented by one or more operative standards containing a first set of actions configured to adhere to constraints in the set of vector representations. The set of vector representations of alphanumeric characters is the same as or similar to publications of guidelines 1402 discussed with reference to FIG. 14. Methods of transforming different modes (e.g., text, image, audio, video) of guidelines into vector representations are discussed with reference to FIG. 14.

In some implementations, the system receives an indicator of a type of operation associated with the vector representations. The system identifies a relevant set of operative standards associated with the type of the vector representations. The system obtains the relevant set of operative standards, via an Application Programming Interface (API). For example, the system includes input channels or interfaces capable of receiving signals or data tags that denote the type (e.g., nature or purpose) of the vector representations being processed. The system can use an API to retrieve the relevant set of operative standards by implementing API endpoints or integration points that connect the system to a centralized repository or database housing the operative standards that can be tagged with associated metadata related to the type of the vector representation.

In some implementations, the AI model is a first AI model. The system can supply the set of vector representations or the original publications of the guidelines into a second AI model. In response, the system can receive from the second AI model, a set of summaries summarizing the set of vector representations, where at least one prompt in the set of prompts includes one or more summaries in the set of summaries. The set of summaries is a representation of the set of vector representations. The set of summaries, in some implementations, serves as a distilled and coherent representation of the textual content derived from set of vector representations. The set of summaries encapsulates the key themes, sentiments, or pertinent information embedded in the guidelines. The summarization process not only captures the essence of user sentiments but also allows for efficient comprehension and analysis. By condensing voluminous textual content into condensed summaries (e.g., the set of summaries), the system allows users to obtain a comprehensive and accessible understanding of the guidelines. For example, the prompt input into the second AI model can request a summary of the provided text or guidelines by including directives such as "Summarize the following text into key points," or "Provide a concise summary capturing the main themes and most important information." Additionally, the prompt can include context or specific aspects to focus on, such as "Provide the major regulatory requirements and the requirements' implications." The prompt can also include definitions of particular terms, such as operative standards or controls.

In act 1604, the system receives, via a user interface, an output generation request including an input for generation of an output using a large-language model (LLM). The input includes a set of gaps associated with one or more scenarios failing to satisfy the one or more operative standards of the set of vector representations. Examples of gaps are discussed with reference to gaps 1406 in FIG. 14. Each scenario is associated with a unique identifier and corresponding metrics indicating one or more actions in the first set of actions absent from the scenario. Examples of scenarios are discussed with reference to FIG. 14. Each gap in the set of gaps includes a set of attributes defining the scenario including the unique identifier of the scenario, the corresponding metrics of the scenario, the corresponding vector representations associated with the scenario, a title of the scenario, a summary of the scenario, and/or a severity level of the scenario.

In some implementations, the set of attributes defining the scenario includes a binary indicator of the severity level of the scenario, a category of the severity level of the scenario, and/or a probability associated with the severity level of the scenario. For instance, a binary indicator can be set to '1' for severe (indicating an issue that requires immediate attention) or '0' for non-severe (where the issue is less urgent but still requires resolution). In another example, categories can range from 'Low' to 'High' severity, helping prioritize remedial actions based on the potential impact and risk associated with each scenario. In a further example, a high probability value can indicate that the compliance gap is highly likely to lead to regulatory fines or data breaches if not addressed promptly.

In act 1606, using the received input, the system constructs a set of prompts for each gap in the set of gaps. The set of prompts for a particular gap includes the set of attributes defining the scenario, such as scenario identifiers, severity assessments (e.g., criticality level), summaries outlining the compliance issue, the first set of actions (e.g., actionable directives or general principles of FIG. 14) of the one or more operative standards, and/or the set of vector representations. In some implementations, the set of prompts for each gap in the set of gaps includes a set of pre-loaded query contexts defining one or more sets of alphanumeric characters associated with the set of vector representations. The pre-loaded query contexts include predefined templates, rules, or configurations that specify criteria for mapping gaps to operative standards. For example, the pre-loaded query context can include definitions of terms such as operative standards and/or gaps. The prompts serve as input to a large-language model (LLM), which is designed to process natural language inputs and generate structured outputs based on learned patterns and data.

In act 1608, for each gap in the set of gaps, the system maps the gap to one or more operative standards of the set of vector representations. The system supplies the prompt of the particular gap into the LLM. Responsive to inputting the prompt, the system receives, from the LLM, a gap-specific set of operative standards including the one or more operative standards associated with the particular gap. In some implementations, the system can generate, for each gap-specific set of operative standard of the set of gap-specific set of operative standards for each gap, an explanation associated with how the one or more operative standards is mapped. The output of the LLM can be in the form of alphanumeric characters. In some implementations, responsive to inputting the prompt, the system receives, from the AI model, the gap-specific set of operative standards, and the corresponding sets of vector representations.

In some implementations, the prompt into the LLM includes a directive to provide a first explanation of why a particular gap should be mapped to a particular operative standard, and also a second explanation of why a particular gap should not be mapped to a particular operative standard. The prompt can further include a directive to provide why the first explanation or the second explanation is weighted more (e.g., why a certain mapping occurs). In some implementations, a human individual can approve or disapprove the mappings based on the first and/or second explanations. Allowing a human-in-the-loop (HITL) and generating a first and second explanation provides transparency to users of the platform regarding the generated mappings.

In act 1610, the system generates for display at the user interface, a graphical representation indicating the gap-specific set of operative standards. The graphical representation includes a first representation of each gap in the set of gaps and a second representation of the corresponding gap-specific set of operative standards. In some implementations, each gap is visually represented to highlight its specific attributes, such as severity level, scenario identifier, and a summary detailing the gap. The graphical representations can use charts, diagrams, or visual frameworks that integrate color coding, icons, or annotations to denote severity levels, compliance progress, or overdue actions. Annotations within the graphical representation can offer additional context or explanations regarding each gap and its alignment with operative standards. Overlays can be used to indicate overdue actions, completed mappings, and/or compliance deadlines.

In act 1612, using the gap-specific set of operative standards, the system generates a second set of actions for each gap in the set of gaps including one or more actions in the first set of actions indicated by the corresponding gap-specific set of operative standards. The second set of actions can modify a portion of the scenario in the corresponding gap to satisfy the one or more operative standards of the set of vector representations. For instance, actions may involve updating policies, enhancing security measures, implementing new protocols, and/or conducting training sessions to improve organizational practices and mitigate risks. Each action can be linked directly to the corresponding gap and its associated operative standards.

In some implementations, the set of prompts is a first set of prompts, and the gap-specific set of operative standards is a first set of operative standards. Using the received input, the system constructs a second set of prompts for each gap in the set of gaps. The second set of prompts for a particular gap includes the set of attributes defining the scenario and the set of vector representations. Using the second set of prompts, the system receives, from the LLM, a second set of operative standards for each gap in the set of gaps. Using the second set of operative standards, the system constructs a third set of prompts for each gap in the set of gaps. The third set of prompts for the particular gap includes the set of attributes defining the scenario and the first set of actions of the one or more operative standards. Using the third set of prompts, the system receives, from the LLM, a third set of operative standards for each gap in the set of gaps. The iterative approach of using multiple sets of prompts with the LLM enhances the system's capability to adapt and respond dynamically to previously generated mappings and thus contributes to a continuous improvement process where insights gained from each interaction cycle contribute to more refined strategies for achieving alignment of an organization with the operative standards.

In some implementations, the set of prompts is a first set of prompts. For each vector representation in the received set of vector representations, the system identifies a set of textual content representative of the set of vector representations. The system partitions the set of textual content into a plurality of text subsets of the set of textual content based on predetermined criteria. The predetermined criteria can include a length of each text subset and/or a complexity of each text subset. For example, the predetermined criteria can be token count or character limit to ensure uniformity and coherence in the division process. Chunking the textual content breaks down a large amount of textual content into manageable units. For token-based partitioning, the system calculates the number of linguistic units, or tokens, within the textual content. These tokens, in some implementations, encompass individual words, phrases, or even characters, depending on the specific linguistic analysis employed. The predetermined token count criterion sets a quantitative guideline, dictating the number of linguistic units encompassed within each chunk. In some implementations, when employing a character limit criterion, the system focuses on the total number of characters within the textual content character limit criterion, in some implementations, involves assessing both alphanumeric characters and spaces, providing a more fine-grained measure of the content's structural intricacies. The predetermined character limit establishes an upper threshold, guiding the system to create segments that adhere to the predefined character limit.

The system can receive user feedback related to deviations between the gap-specific set of operative standards and a desired set of operative standards. The system can iteratively adjust the sets of prompts to modify the gap-specific set of operative standards to the desired set of operative standards. The system can generate action plans, updating compliance strategies, and/or refine operational practices to enhance alignment with the set of vector representations. The system can generate a set of actions (e.g., a modification plan) that adjust the current attributes of the scenario to a desired set of attributes of the scenario. The system can identify the root cause of the difference between the attributes of the scenario and the desired set of attributes of the scenario. For example, the desired set of attributes of the scenario can include a certain action not found in the current attributes of the scenario (e.g., an anonymization procedure). The actions (e.g., the anonymization procedure) can be preloaded into the system.

Generating Actionable Items from Guidelines

Figure 17:
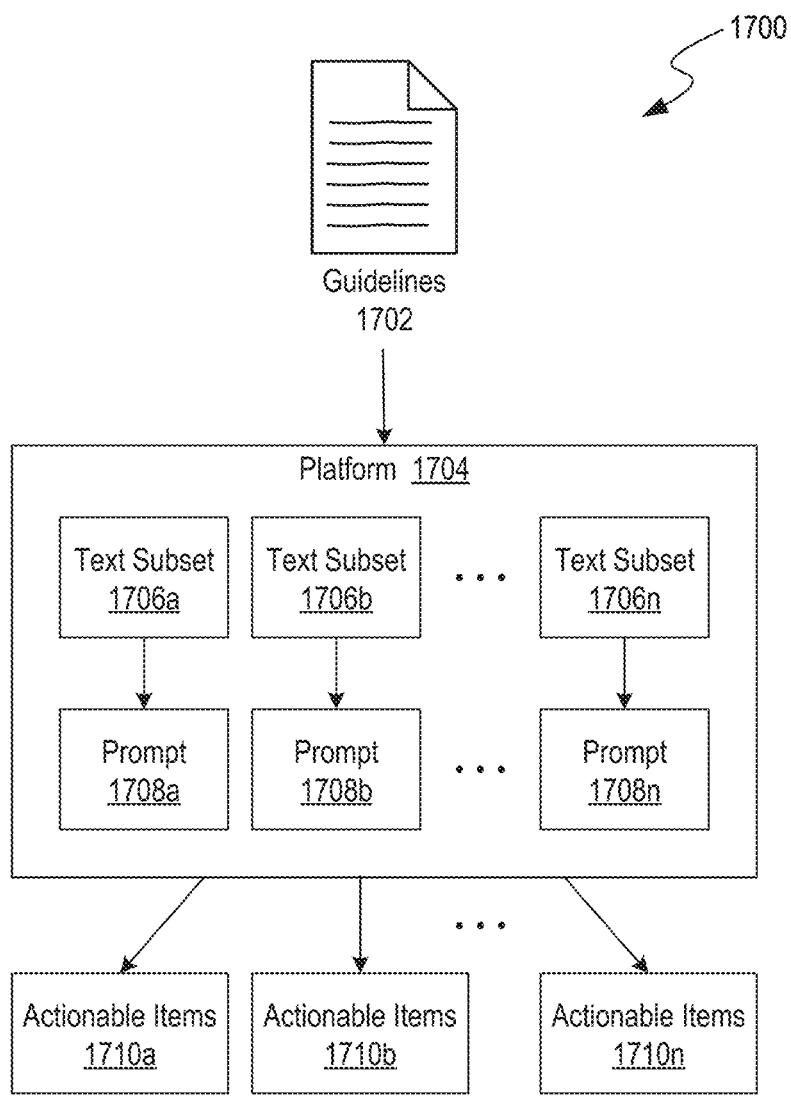
FIG. 17 is an illustrative diagram illustrating an example environment of the platform identifying actionable items from guidelines, in accordance with some implementations of the present technology.

FIG. 17 is an illustrative diagram illustrating an example environment 1700 of the platform identifying actionable items 1710a-n from guidelines 1702, in accordance with some implementations of the present technology. Environment 1700 includes guidelines 1702, platform 1704, text subsets 1706a-n, prompts 1708a-n, and actionable items 1710a-n. Guidelines 1702 are the same as or similar to guidelines 1402 with reference to FIG. 14. Platform 1704 is the same as or similar to platform 1304 with reference to FIG. 13. Implementations of example environment 1700 can include different and/or additional components or can be connected in different ways.

Platform 1704 can be a web-based application that hosts various use cases, such as compliance, that allows users to interact via a front-end interface. Inputs to the platform 1704 can be guidelines 1702 in various formats (e.g., text, Excel). Further examples of platform 1704 are discussed with reference to platform 1304 in FIG. 13. The backend of platform 1704 can chunk (e.g., partition) the guidelines into text subsets 1706a-n and vectorize the text subsets 1706a-n. The vectorized representations of the text subsets 1706a-n can be stored in a database accessible by the platform 1704. The platform 1704 can use an API call to send prompts to an AI model (such as an LLM), as described further in FIG. 13. Examples of prompts are further discussed with reference to FIG. 19. The AI model processes the prompts and returns the output of actionable items to the backend of platform 1704, which can format the output into a user-friendly structure.

Text subsets 1706a-n refer to portions of the guidelines 1702 that have been extracted or divided (e.g., based on specific criteria) into smaller segments. Each text subsets 1706a-n can be categorized by topic, section, or other relevant factors. By breaking down large volumes of text into subsets, the platform can focus on specific parts of the guidelines. The structured approach additionally allows the platform to handle large volumes of regulatory text efficiently. Methods of partitioning the guidelines 1702 are discussed with reference to FIG. 19.

Prompts 1708a-n are specific queries or instructions generated from the text subsets 1706a-n that are formulated to direct the behavior and output of an AI model, such as identifying actionable items from the text subsets 1706a-n of regulatory guidelines 1702. For example, for text subset 1706a, a corresponding prompt 1708a is constructed. In some implementations, a prompt can include multiple text subsets. In some implementations, a single text subset can be associated with multiple prompts. Prompts 1708a-n causes the AI model to identify particular attributes of the text subsets 1706a-n, such as regulatory obligations or compliance requirements to dynamically generate meaningful outputs (e.g., actionable items). In some implementations, the prompts 1708a-n can be generated using a second AI model. The second AI model can analyze the text subsets 1706a-n or the guidelines 1702 directly to identify features of the text subset such as context, entities, and the relationships between the features by, for example, breaking down the input into smaller components and/or tagging predefined keywords. The second AI model can construct prompts that are contextually relevant using the identified features. For instance, if the input pertains to compliance guidelines, the second AI model can identify sections within the guidelines and frame prompts that highlight the most relevant information (e.g., information directed towards compliance guidelines). The prompts can include specific questions or statements that direct the first AI model to focus on particular aspects, such as "What are the key compliance requirements for data protection in this guideline?"

The second AI model can, in some implementations, employ query expansion. Query expansion is a process that enhances the original query by including synonyms, related concepts, and/or additional contextually relevant terms to improve the comprehensiveness of the response. For example, if the initial prompt is "Identify key actionable items for data protection," the second AI model can expand the query by including keywords such as "privacy regulations," "data security measures," and "information governance." In some implementations, the second AI model can reference domain-specific thesauruses and/or pre-trained word embeddings to find synonyms and related terms to the identified elements.

Prompts 1708a-n can include definitions, keywords, and instructions that guide the AI model in identifying relevant actionable items. For instance, definitions can clarify what constitutes an "actionable item" or "obligation." Further, prompts 1708a-n can specify keywords like "must," "shall," or "required." The keywords may indicate mandatory actions or prohibitions that need to be identified as actionable items. For example, a prompt can instruct the AI model to flag any sentence containing the word "must" as it likely denotes a regulatory requirement. In another example, prompts 1708a-n can direct the AI model to extract all instances of deadlines for compliance actions, descriptions of required documentation, or procedures for reporting to regulatory bodies. Instructions can also include formatting guidelines, ensuring that the extracted actionable items are presented in a consistent and usable format. Methods of using prompts 1708a-n to direct the AI model, and further examples of prompts 1708a-n are discussed with reference to FIG. 19.

Actionable items 1710a-n (e.g., directives, actions) are the specific tasks or requirements identified by the AI model from the guidelines, based on the analysis of text subsets 1706a-n and prompts 1708a-n. In some implementations, rather than being mere excerpts from the text subsets 1706a-n, actionable items 1710a-n can be distilled, comprehensive instructions that define specific measures or procedures to implement. For instance, an actionable item might outline the frequency and format of compliance reports required, specify the data to be included, and designate the department responsible for submission. Actionable items 1710a-n are designed to translate regulatory text into actionable steps that organizations can directly operationalize. Actionable items 1710a-n can include tasks such as reporting, record-keeping, compliance checks, and other regulatory actions.

Each actionable item can include metadata such as the responsible party within the organization, the type of customer or stakeholder affected, and/or other relevant identifiers. An AI model can use natural language processing (NLP) algorithms to parse through text subsets 1706a-n to identify relevant phrases, keywords, and semantic structures (e.g., as instructed by the prompts 1708a-n) that indicate actionable items 1710a-n within the guidelines 1702. Prompts 1708a-n can direct the AI model by providing contextual cues and specific queries that direct the AI model to focus on particular guidelines or aspects of guidelines within guidelines 1702. Methods of generating actionable items 1710a-n, and further examples of actionable items 1710a-n are discussed with reference to FIG. 19.

Figure 18:
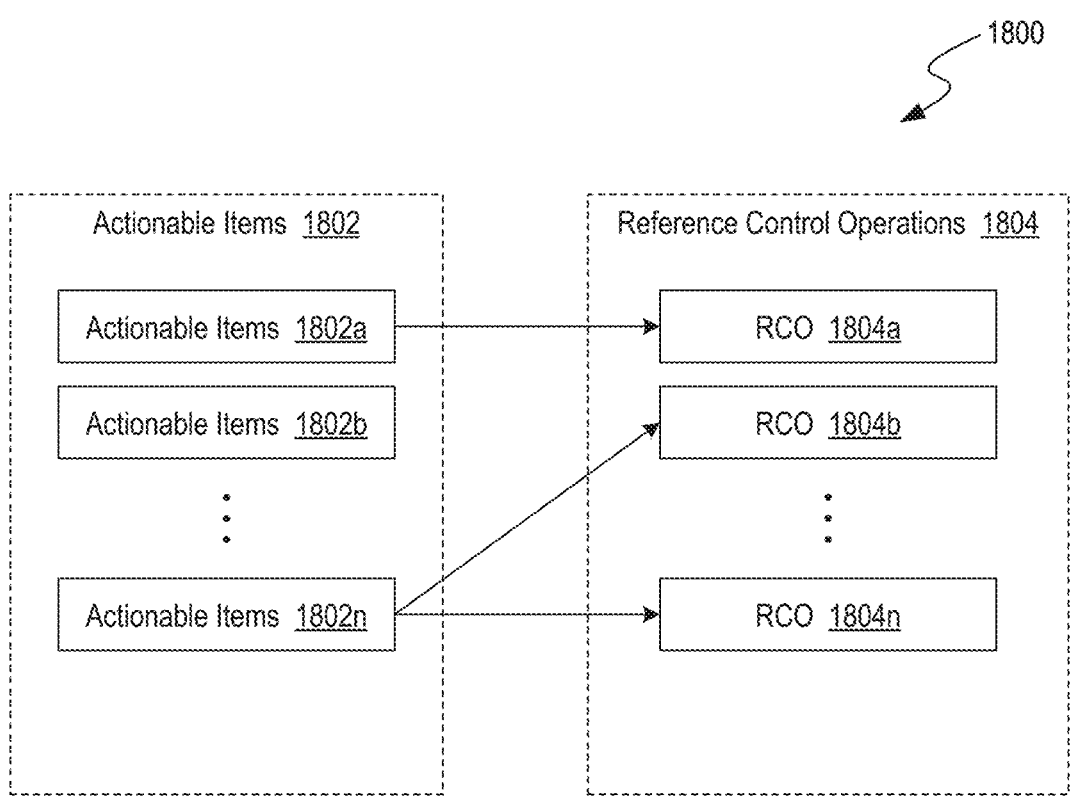
FIG. 18 is an illustrative diagram illustrating an example environment of the platform performing a gap analysis using the identified actionable items and the current reference control operations, in accordance with some implementations of the present technology.

FIG. 18 is an illustrative diagram illustrating an example environment 1800 of the platform 1704 performing a gap analysis using the identified actionable items 1802a-n and the current reference control operations 1804a-n, in accordance with some implementations of the present technology. Environment 1800 includes actionable items 1802a-n and reference control operations (RCOs) 1804a-n. Actionable items 1802a-n are the same as or similar to actionable items 1710a-n with reference to FIG. 17. Implementations of example environment 1800 can include different and/or additional components or can be connected in different ways.

Actionable items 1802a-n are derived from guidelines using platform 1704. On the other hand, RCOs 1804a-n are pre-existing control measures that have been previously identified and documented as responses to similar or same guidelines. The platform 1704 can use an AI model (that can be the same as or different from the AI model used to extract the actionable items 1802a-n) to compare actionable items 1802a-n against RCOs 1804a-n, by conducting gap analysis to identify any discrepancies or inadequacies in the RCOs 1804a-n.

The gap analysis process evaluates whether each actionable item is adequately covered by the existing RCOs 1804a-n. For example, actionable items 1802a-n can each be mapped to no RCOs 1804a-n, one RCO within RCOs 1804a-n, or multiple RCOs within RCOs 1804a-n. When an actionable item is mapped to no RCOs 1804a-n, it indicates a gap in the existing control framework, signifying that the organization lacks the necessary controls to address a particular actionable item. If an actionable item is mapped to a single RCO, it can demonstrate that the existing control is adequately addressing the actionable item, suggesting that the current measures are sufficient. When an actionable item maps to multiple RCOs, it can imply redundancy or overlap in the control framework, which may indicate potential inefficiencies.

If gaps are identified (e.g., when an actionable item 1802a-n is mapped to no RCOs 1804a-n), the gaps can be categorized into different categories, such as material risk gaps or rewording gaps. Rewording gaps can suggest that the current RCOs do, in fact, address the requirements and the reason for the identified gap is due to wording. On the other hand, material risk gaps can indicate actionable items 1802a-n that are not mitigated by the current RCOs 1804a-n and can cause the platform to suggest and/or automatically implement the creation of new or enhanced control measures.

When gaps are detected, such as missing actionable items, incomplete actionable items, or areas where the RCOs 1804a-n do not fully address the actionable items, the system can recommend modifications to the RCOs 1804a-n. The modifications can include adding new control measures (e.g., new actionable items), updating existing RCOs 1804a-n to cover overlooked aspects/actionable items, and/or refining the language of RCOs 1804a-n to ensure clarity and completeness. By iterating through the process, organizations can enhance the control operations to more comprehensively meet guideline (e.g., guideline 1702 of FIG. 17) standards.

Figure 19:
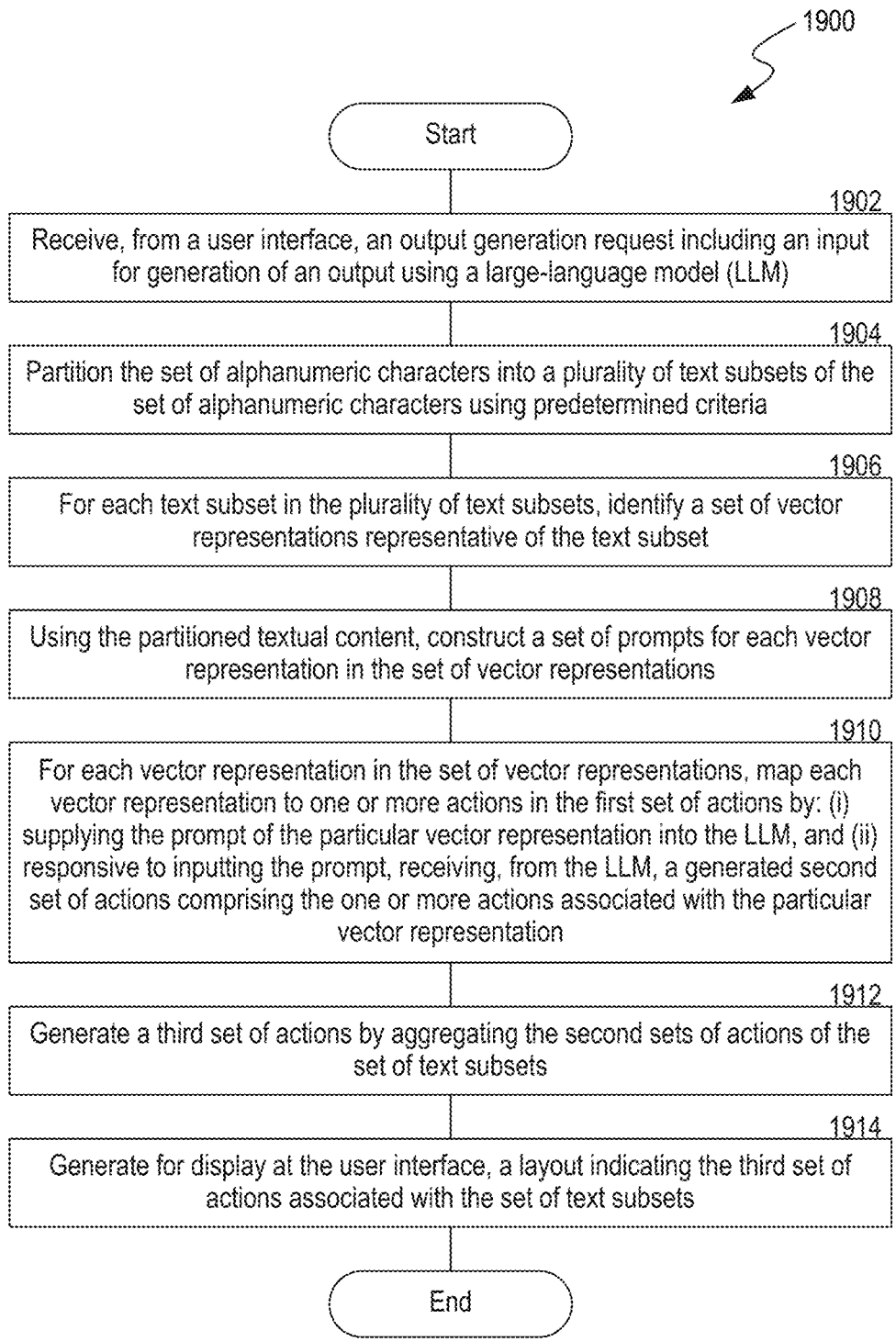
FIG. 19 is a flow diagram illustrating a process of identifying actionable items from guidelines, in accordance with some implementations of the present technology.

FIG. 19 is a flow diagram illustrating a process 1900 of identifying actionable items from guidelines, in accordance with some implementations of the present technology. In some implementations, the process 1900 is performed by components of example devices 200 and computing devices 302 illustrated and described in more detail with reference to FIG. 2 and FIG. 3, respectively. Particular entities, for example, AI models such as LLM 1310, are illustrated and described in more detail with reference to FIG. 13. Likewise, implementations can include different and/or additional steps or can perform the steps in different orders.

In act 1902, the system receives, from a user interface, an output generation request including an input for generation of an output using an LLM. The input includes a set of alphanumeric characters (e.g., guidelines 1702 of FIG. 17) representing operative standards associated with a first set of actions (e.g., actionable items 1710a-n in FIG. 17) that adhere to the constraints of the set of alphanumeric characters. For example, the user interface can be within platform 1704 and can include fields for users to enter the alphanumeric characters and/or upload the files containing the alphanumeric characters and other relevant data, such as context or additional instructions. The user interface can include separate fields for different types (e.g., fields of use) of operative standards. The user interface can support various file formats, such as text files, spreadsheets, or other file types. The additional instructions/context can include the context in which the operative standards are applied or additional keywords or definitions that guide the AI model's output generation.

In act 1904, the system partitions the set of alphanumeric characters into a plurality of text subsets (e.g., text subsets 1706a-n of FIG. 17) of the set of alphanumeric characters using predetermined criteria. The predetermined criteria can include a length of each text subset and/or a complexity of each text subset. For example, the system can divide the alphanumeric characters into subsets of a specific size, typically measured by the number of characters, words, or sentences. As another example, the system can divide the text into segments of 500 words each. The exact length can be adjusted by a user, and/or adjusted dynamically based on the location of particular sections of the alphanumeric characters (e.g., where a sentence ends) to maintain the logical integrity of the content and to ensure that sentences or key phrases are not arbitrarily split. For example, the system can first parse through the text subset, and then identify the boundaries of sentences within the text subset by recognizing punctuation marks and other delimiters that signal the end of a sentence.

Complexity criteria can include considering elements such as vocabulary difficulty, sentence structure, and/or thematic density. The system can use natural language processing (NLP) techniques and/or external tools to provide readability scores (e.g., using Flesch-Kincaid readability tests to calculate readability based on sentence length and the number of syllables per word, where a text with short sentences and simple words would score differently from a text with long, complex sentences), identify technical jargon (e.g., using TD-IDF to highlight the importance of a word in a document relative to a collection of documents, where a high TF-IDF score often indicates technical terms), and assess the syntactic structure of the text (e.g., using part-of-speech tagging to label the grammatical categories of each word). The complexity analysis can be aggregated through predetermined weights for each criterion. Based on the aggregated complexity scores, the system can dynamically create subsets that group similarly complex sections together. The system can partition the text ensuring that each subset is homogeneous in terms of complexity.

In act 1906, for each text subset in the plurality of text subsets, the system identifies a set of vector representations representative of the text subset. Text vectorization transforms textual data into a numerical format. Each text subset can be pre-processed, which can include tokenization, normalization, and/or stop word removal. Tokenization is the process of breaking down text into smaller units called tokens. These tokens can be words, phrases, or even individual characters. For instance, the sentence "The quick brown fox jumps over the lazy dog" can be tokenized into individual words like "The", "quick", "brown", "fox", "jumps", "over", "the", "lazy", and "dog". Normalization converts text into a consistent format, making it easier to process. This can include converting all characters to lowercase, removing punctuation, expanding contractions (e.g., "don't" to "do not"), and handling special characters. Normalization ensures uniformity in the text, reducing variations that could lead to inaccuracies in analysis. For example, normalizing "Don't" and "don't" can result in both being converted to "do not". Stop word removal is the process of filtering out common words that carry little semantic value and are often considered irrelevant for text analysis. These words include "the", "is", "in", "and", etc. Removing stop words helps in focusing on the more meaningful parts of the text. For example, in the sentence "The quick brown fox jumps over the lazy dog", removing stop words would result in "quick", "brown", "fox", "jumps", "lazy", and "dog". To vectorize the text subsets to identify the vector representations of the corresponding text subsets, similar methods can be used with reference to vectorizing prompts in FIG. 13.

In some implementations, each vector representation in the set of vector representations can include one or more electronic tags associated with a type of operation. The system can receive, from the user interface, the type of operation. Using the type of operation, the system can obtain a relevant set of alphanumeric characters, via an Application Programming Interface (API). For example, in a compliance scenario, tags might include "reporting," "record-keeping," or "compliance checks." These tags are crucial as they provide context and allow for the organized retrieval of information. In some implementations, the user interface can be a web-based platform (e.g., data generation platform 102 in FIG. 1, platform 1704 in FIG. 17) that includes input fields where users can specify the type of operation they are interested in. For example, if the user specifies "reporting," the system can retrieve all alphanumeric characters associated with the "reporting" tag. The system, upon receiving this input, identifies the corresponding electronic tags that match this type of operation by using the API to query the database and fetch the alphanumeric characters that have been tagged accordingly.

In act 1908, using the set of vector representations, the system constructs a set of prompts for each vector representation in the set of vector representations. The set of prompts can be a set of inputs configured to be ingested by any type of AI model. The set of prompts can include various types of data such as text, numerical values, categorical labels, and/or multimedia elements, depending on the application. In some implementations, the set of prompts can be used across different types of AI models, such as a natural language processing (NLP) model, machine learning classifier, image recognition system, and/or any other AI technology.

In some implementations, the set of prompts can be text, image, audio, video and/or other computer-ingestible format. For input that is not text (e.g., image, audio, and/or video), the input can first be transformed into a universal format such as text prior to processing. Optical character recognition (OCR) can be used for images containing text, and speech-to-text algorithms can be used for audio inputs. The text can then be analyzed and structured into prompts for the AI model to use. In some implementations, in cases where transforming to text is not feasible or desirable, the system can use vector comparisons to handle non-text prompts directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

The set of prompts for a particular text subset can include the set of alphanumeric characters, a set of pre-loaded query context defining the first set of actions, a set of keywords associated with the set of textual content of the corresponding vector representations of the first set of actions, and/or the text subset itself. In some implementations, the system selects vector representations that are relevant to the specific use case and combines them in a way that follows a logical flow (e.g., based on previous responses to previously supplied prompts). For example, if the task is to create a prompt to extract actionable items focused on data encryption, the system can retrieve vector representations related to encryption standards, best practices, and regulatory requirements. The retrieved vector representations can be assembled into a prompt that guides the LLM through one or more structured questions or scenarios using prompt engineering.

Prompt engineering is a process of structuring text that can be interpreted by a generative AI model (e.g., the LLM). For example, in some implementations, a prompt (e.g., command set) includes the following elements: instruction, context, input data, and an output specification. Although a prompt is a natural-language entity, a number of prompt engineering strategies help structure the prompt in a way that improves the quality of output. For example, in the prompt "Please generate an image of a bear on a bicycle for a children's book illustration," "generate," is the instruction, "for a children's book illustration" is the context, "bears on a bicycle" is the input data, and "an image" is the output specification. The techniques include being precise, specifying context, specifying output parameters, specifying target knowledge domain, and so forth. Automatic prompt engineering techniques have the ability to, for example, include using the LLM to generate a plurality of candidate prompts, automatically score the candidates, and select the top candidates.

In some implementations, prompt engineering includes the automation of a target process—for instance, a prompt causes an AI model to generate computer code, call functions in an API, and so forth. Additionally, in some implementations, prompt engineering includes automation of the prompt engineering process itself—for example, an automatically generated sequence of cascading prompts, in some implementations, include sequences of prompts that use tokens from pre-trained LLM outputs as further instructions, context, inputs, or output specifications for downstream LLMs. In some implementations, prompt engineering includes training techniques for LLMs that generate prompts (e.g., chain-of-thought prompting) and improve cost control (e.g., dynamically setting stop sequences to manage the number of automatically generated candidate prompts, dynamically tuning parameters of prompt generation models or downstream models). To ensure the prompts are logically structured and contextually appropriate, the system can apply rules or templates that dictate the organization and format of the prompts.

In some implementations, the AI model is a first AI model. The system can supply one or more vector representations of the set of vector representations into a second AI model, and receive from the second AI model, a set of summaries summarizing the set of vector representations. The system can include, in at least one prompt in the set of prompts, one or more summaries in the set of summaries. Methods of summarizing the vector representations (e.g., the guidelines) are discussed with reference to summarizing the original publications of the guidelines in FIG. 16.

In act 1910, for each vector representation in the set of vector representations, the system maps each vector representation to one or more actions in the first set of actions. To map each text subset, the system supplies one or more prompts of the set of prompts of the particular vector representation into the LLM. Responsive to supplying the one or more prompts, the system receives, from the LLM, a generated second set of actions comprising the one or more actions associated with the particular vector representation. Subsequent actions in the second set of actions generated subsequent to previous actions in the second set of actions can be generated using the previous actions in the second set of actions.

In some implementations, the system generates, for each text subset of the set of text subsets, an explanation associated with how the text subset is mapped to the corresponding one or more actions in the third set of actions. For example, the prompt can instruct the LLM on the definition of terms (e.g., "explanation"), the format of the explanation, and what aspects of the mapping to explain. The prompt can define key terms and parameters such as the format, length, and detail required in each explanation. For instance, the prompt can specify that the explanation should include a summary of the text subset, the identified action(s), and/or the rationale behind the mapping. The explanation can provide how the text subset was interpreted, why a particular action was identified, and/or how the action meets the guideline's requirements.

In act 1912, the system generates a third set of actions by aggregating the second sets of actions of the set of text subsets. The aggregation process can involve sorting, categorizing, and prioritizing the actions based on their relevance, urgency, and impact on compliance. For instance, actions related to data protection, reporting requirements, and monitoring procedures can be grouped and organized under broader categories, making it easier for users to understand and implement them effectively. Furthermore, the system can apply filtering and validation checks to ensure the completeness of the third set of actions. For example, the system can cross-reference the aggregated actions to identify any potential overlaps between the actions. When certain actions are repeated across different subsets, the system can consolidate the actions.

In some implementations, an AI model (e.g., an LLM) can be used to aggregate actions by inputting the second sets of actions of the set of text subsets. The AI model can analyze the second sets of actions of the set of text subsets to identify recurring patterns, commonalities, and/or dependencies across different sets of actions. The AI model can apply clustering algorithms to group similar actions together based on the actions' contextual relevance to other actions. For example, actions related to enhancing data encryption protocols can be clustered together under a cybersecurity category, while actions concerning audit procedures can be clustered together under a financial compliance category. In some implementations, predefined rules and logical criteria can guide the aggregation of the second sets of actions. Rules can be associated with particular keywords associated with the second sets of actions. For example, rulesets can dictate that actions with the word "loan" in the action must be categorized under the "financial" category.

By recognizing semantic similarities and functional relationships among actions, the AI model can categorize actions within the second sets of actions of the set of text subsets under broader categories such as cybersecurity measures, financial reporting standards, or environmental compliance protocols. Using the categorized actions, the same or different AI model can consolidate the actions within each category by grouping similar actions into fewer actions.

In act 1914, the system generates for display at the user interface, a layout indicating the third set of actions associated with the set of vector representations. The layout can include a first representation of the set of alphanumeric characters and a second representation of the corresponding actions in the third set of actions. For example, the vector representations can appear as excerpts or summaries of the regulatory texts or guidelines that were inputted into the system. Each component of the first representation and the second representation of the user interface can include dynamic data, allowing for the user interface to update as new text subsets and actions are processed.

In some implementations, the system receives user feedback (e.g., through the user interface of the platform) related to deviations between the third set of actions and a desired set of actions. In response to the user feedback, the system can iteratively adjust the sets of prompts to modify the third set of actions to the desired set of actions. For example, the system can analyze the nature of the deviations highlighted by users. The system can categorize the deviations in categories such as inaccuracies in interpreting regulatory requirements, missing actions, and/or irrelevant actions. Based on the analysis, adjustments are made to the prompts, which can include refining the query context, modifying keyword parameters, or updating other criteria used to identify actionable items. Subsequently, the system reapplies the adjusted prompts to the text subsets, triggering the AI models to generate a revised third set of actions. In some implementations, the third set of actions is displayed on the user interface of the platform for further validation via user input.

In some implementations, the system provides a fourth set of actions associated with current operative standards. The fourth set of actions can be, for example, RCOs 1804a-n discussed with reference to FIG. 18. The system identifies a set of gaps by comparing the third set of actions with the fourth set of actions by performing, for example, a gap analysis discussed with reference to FIG. 18. The set of gaps can include actions present in the third set of actions and absent in the fourth set of actions. The system can determine, for each gap in the set of gaps, a type of difference between the corresponding action within the third set of actions and the fourth set of actions. For example, the type of difference can be associated with a presence of a particular set of alphanumeric characters within the actions associated with current operative standards and/or a semantic meaning of one or more sets of alphanumeric characters within the actions associated with current operative standards. For instance, regulatory guidelines may require the implementation of specific obligations denoted by certain alphanumeric codes or identifiers within the actions. Detecting the presence or absence of the certain sets of alphanumeric characters helps in determining any remedial actions needed to remedy the gap. Moreover, differences in operative standards can extend beyond literal text to include semantic meanings conveyed by sets of alphanumeric characters within the actions. Semantic analysis interprets the underlying meanings and implications of the actions specified in the current operative standards and compares the underlying meanings and implications with those of the input guidelines. For example, if a current operative standard's action mandates a particular encryption practice, though the exact wording of the action may not match that of the LLM's output third set of actions, the underlying meaning of both may be equivalent (e.g., the gap can be classified as a rewording gap).

Using the type of difference, the system can classify each gap in the set of gaps. Classifying each gap in the set of gaps can include generating a binary indicator of a severity level of the gap, a category of the severity level of the gap, and/or a probability associated with the severity level of the gap. In some implementations, in response to the classification of a particular gap in the set of gaps reaching a predetermined threshold, the system adds the corresponding action within the third set of actions to the fourth set of actions. Using the added corresponding action, the system can automatically trigger an automated workflow indicated by the added corresponding action. The automated workflow can include adding a representation of the corresponding action to the current operative standards. For example, if a gap is found related to data privacy practices, and the corresponding action can include updating data handling procedures, the system can automatically execute the updates to the current data handling procedures. In some implementations, the automated workflow is predefined by a ruleset. The ruleset can define criteria including specific thresholds, conditions, or patterns within the gap that prompt the system to identify the sequence of actions to rectify the identified gap. For instance, if a gap is related to updating particular threshold parameters of a certain field, the ruleset can prescribe actions such as replacing the current threshold parameters of the certain field with the new threshold parameter indicated by the gap. The automated workflow can include modifying existing actions in the current operative standards, removing actions from the current operative standards, and/or adding new actions into the current operative standards.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions stored thereon, wherein the instructions when executed by at least one data processor of a system, cause the system to:
    receive, from a user interface, an output generation request including an input for generation of an output using a language model,
        wherein the input includes a set of alphanumeric characters representing operative standards associated with a first set of actions configured to adhere to constraints of the set of alphanumeric characters;
    partition the set of alphanumeric characters into a plurality of text subsets of the set of alphanumeric characters using predetermined criteria,
        wherein the predetermined criteria includes one or more of: a length of each text subset or a complexity of each text subset;
    for each text subset in the plurality of text subsets, identify a set of vector representations representative of the text subset;
    using the set of vector representations, construct a set of prompts for each vector representation in the set of vector representations,
        wherein each prompt of the set of prompts for a particular vector representation includes two or more of: (1) the set of alphanumeric characters, (2) a set of pre-loaded query context defining the first set of actions, (3) a set of keywords associated with the set of alphanumeric characters of corresponding vector representations of the first set of actions, or (4) the text subset;
    for each vector representation in the set of vector representations, map each vector representation to one or more actions in the first set of actions by:
        supplying one or more prompts of the set of prompts of the particular vector representation into the language model, and
        responsive to supplying the one or more prompts of the set of prompts, receiving, from the language model, a generated second set of actions comprising the one or more actions associated with the particular vector representation,
            wherein subsequent actions in the second set of actions generated subsequent to previous actions in the second set of actions are generated using the previous actions in the second set of actions;
    generate a third set of actions by aggregating the second sets of actions of the set of text subsets; and
    generate for display at the user interface, a layout indicating the third set of actions associated with the set of text subsets, wherein the layout includes a first representation of the set of alphanumeric characters and a second representation of corresponding actions in the third set of actions.

2. The non-transitory, computer-readable storage medium of claim 1, wherein the instructions further cause the system to:
    provide a fourth set of actions associated with current operative standards; and
    identify a set of gaps by comparing the third set of actions with the fourth set of actions,
        wherein the set of gaps include actions present in the third set of actions and absent in the fourth set of actions.

3. The non-transitory, computer-readable storage medium of claim 2, wherein the instructions further cause the system to:
    determine, for each gap in the set of gaps, a type of difference between a corresponding action within the third set of actions and the fourth set of actions,
        wherein the type of difference is associated with one or more of: a presence of a particular set of alphanumeric characters within the actions associated with current operative standards or a semantic meaning of one or more sets of alphanumeric characters within the actions associated with current operative standards; and
    using the type of difference, classify each gap in the set of gaps.

4. The non-transitory, computer-readable storage medium of claim 3, wherein classifying each gap in the set of gaps includes generating one or more of:
    a binary indicator of a severity level of the gap,
    a category of the severity level of the gap, or
    a probability associated with the severity level of the gap.

5. The non-transitory, computer-readable storage medium of claim 3, wherein the instructions further cause the system to:
    in response to the classification of a particular gap in the set of gaps reaching a predetermined threshold, add the corresponding action within the third set of actions to the fourth set of actions.

6. The non-transitory, computer-readable storage medium of claim 5, wherein the instructions further cause the system to:
    using the added corresponding action, automatically triggering an automated workflow indicated by the added corresponding action,
        wherein the automated workflow includes adding a representation of the corresponding action to the current operative standards.

7. The non-transitory, computer-readable storage medium of claim 1, wherein each vector representation in the set of vector representations include one or more electronic tags associated with a type of operation, wherein the instructions further cause the system to:

receive, from the user interface, the type of operation; and using the type of operation, obtaining a relevant set of alphanumeric characters, via an Application Programming Interface (API).

8. A method performed by a computer device for mapping guidelines to one or more actions, the method comprising:

receiving an output generation request including an input for generation of an output using an AI model, wherein the input includes a set of alphanumeric characters representing operative standards associated with a first set of actions configured to adhere to constraints of the set of alphanumeric characters;

partition the set of alphanumeric characters into a plurality of text subsets of the set of alphanumeric characters using predetermined criteria, wherein the predetermined criteria includes one or more of: a length of each text subset or a complexity of each text subset;

for each text subset in the plurality of text subsets, identify a set of vector representations representative of the text subset;

using the set of vector representations, construct a set of prompts for each vector representation in the set of vector representations, wherein each prompt of the set of prompts for a particular vector representation includes two or more of: (1) the set of alphanumeric characters, (2) a set of pre-loaded query context defining the first set of actions, (3) a set of keywords associated with the set of alphanumeric characters of corresponding vector representations of the first set of actions, or (4) the text subset;

for each vector representation in the set of vector representations, mapping each vector representation to one or more actions in the first set of actions by:

supplying one or more prompts of the set of prompts of the particular vector representation into the AI model, and responsive to supplying the one or more prompts of the set of prompts, receiving, from the AI model, a generated second set of actions comprising the one or more actions associated with the particular vector representation, wherein subsequent actions in the second set of actions generated subsequent to previous actions in the second set of actions are generated using the previous actions in the second set of actions; and generate a third set of actions by aggregating the second sets of actions of the set of text subsets.

9. The method of claim 8, wherein the AI model is a first AI model, further comprising:

supplying at least a portion of the set of alphanumeric characters into a second AI model; and receiving from the second AI model, a set of summaries summarizing the set of alphanumeric characters, wherein at least one prompt in the set of prompts includes one or more summaries in the set of summaries.

10. The method of claim 8, further comprising:

generating, for each text subset of the set of text subsets, an explanation associated with how the text subset is mapped to corresponding one or more actions in the third set of actions.

11. The method of claim 8, further comprising:

receiving user feedback related to deviations between the third set of actions and a desired set of actions; and iteratively adjusting the sets of prompts to modify the third set of actions to the desired set of actions.

12. The method of claim 8, further comprising:

providing a fourth set of actions associated with current operative standards;

identifying a set of gaps by comparing the third set of actions with the fourth set of actions, wherein the set of gaps include actions present in the fourth set of actions and absent in the third set of actions; and in response to identifying the set of gaps, automatically triggering an automated workflow indicated by the set of gaps, wherein the automated workflow includes removing a representation of one or more corresponding actions within the fourth set of actions and associated with one or more gaps of the set of gaps from the current operative standards.

13. The method of claim 8, further comprising:

providing a fourth set of actions associated with current operative standards; and identifying a set of gaps by comparing the third set of actions with the fourth set of actions.

14. The method of claim 13, further comprising:

determining, for each gap in the set of gaps, a type of difference between a corresponding action within the third set of actions and the fourth set of actions; and using the type of difference, classifying each gap in the set of gaps.

15. A system comprising:

at least one hardware processor; and at least one non-transitory memory storing instructions, which, when executed by the at least one hardware processor, cause the system to:

receive an output generation request including an input for generation of an output using an AI model, wherein the input includes a set of guidelines representing operative standards associated with a first set of actions configured to adhere to constraints of the set of guidelines;

for each guideline in the received set of guidelines, identify a set of textual content representative of the set of guidelines;

partition the set of textual content into a plurality of text subsets of the set of textual content using predetermined criteria, wherein the predetermined criteria includes one or more of: a length of each text subset or a complexity of each text subset;

using the partitioned textual content, construct a set of prompts for each text subset in the plurality of text subsets, wherein each prompt of the set of prompts for a particular text subset includes one or more of: (1) the set of guidelines, (2) a set of pre-loaded query context defining the first set of actions, (3) a set of keywords associated with the set of textual content of corresponding guidelines of the first set of actions, or (4) the text subset;

for each text subset in the set of text subsets, map each text subset to one or more actions in the first set of actions by:
supplying one or more prompts of the set of prompts of the particular text subset into the AI model, and responsive to supplying the one or more prompts of the set of prompts, receiving, from the AI model, a generated second set of actions comprising the one or more actions associated with the particular text subset of the guideline,
wherein subsequent actions in the second set of actions generated subsequent to previous actions in the second set of actions are generated using the previous actions in the second set of actions; and
generate a third set of actions by aggregating, for each guideline, a corresponding second set of actions.

16. The system of claim 15, wherein the AI model is a Large Language model (LLM).

17. The system of claim 15, wherein the system is further caused to:
provide a fourth set of actions associated with current operative standards; and
identify a set of gaps by comparing the third set of actions with the fourth set of actions, wherein the set of gaps include actions present in the third set of actions and absent in the fourth set of actions.

18. The system of claim 17, wherein the system is further caused to:
determine, for each gap in the set of gaps, a type of difference between a corresponding action within the third set of actions and the fourth set of actions; and
using the type of difference, classify each gap in the set of gaps.

19. The system of claim 15, wherein the system is further caused to:
receive user feedback related to deviations between the third set of actions and a desired set of actions; and
iteratively adjust the sets of prompts to modify the third set of actions to the desired set of actions.

20. The system of claim 15, wherein each guideline in the set of guidelines includes one or more electronic tags associated with a type of operation, wherein the system is further caused to:
receive the type of operation; and
using the type of operation, obtaining a relevant set of guidelines, via an Application Programming Interface (API).

* * * * *